United States Patent
Ovshinsky et al.

(10) Patent No.: US 7,309,535 B2
(45) Date of Patent: Dec. 18, 2007

(54) AIR BREATHING FUEL CELL HAVING BI-CELL UNIT CELLS

(75) Inventors: Stanford R. Ovshinsky, Bloomfield Hills, MI (US); Zdravjo Menjak, Rochester Hills, MI (US); Srinivasan Venkatesan, Southfield, MI (US); Rajeev Puttaiah, Troy, MI (US); Hong Wang, Troy, MI (US)

(73) Assignee: Ovonic Fuel Cell Company, LLC, Rochester Hills, MI (US)

( * ) Notice: Subject to any disclaimer, the term of this patent is extended or adjusted under 35 U.S.C. 154(b) by 561 days.

(21) Appl. No.: 10/650,863

(22) Filed: Aug. 28, 2003

(65) Prior Publication Data

US 2004/0157105 A1    Aug. 12, 2004

Related U.S. Application Data

(63) Continuation-in-part of application No. 10/364,978, filed on Feb. 12, 2003, now abandoned.

(51) Int. Cl.
   *H01M 8/00*    (2006.01)
   *H01M 12/00*    (2006.01)
   *H01M 2/02*    (2006.01)
   *H01M 2/14*    (2006.01)
   *H01M 8/04*    (2006.01)

(52) U.S. Cl. ............................ 429/12; 429/34; 429/39; 429/9; 429/27; 429/17

(58) Field of Classification Search .................. 429/12, 429/34, 35, 9, 39
   See application file for complete search history.

(56) References Cited

U.S. PATENT DOCUMENTS 5,712,054 A * 1/1998 Kejha ......................... 429/21

(Continued)

FOREIGN PATENT DOCUMENTS

GB    2163595 A *  7/1984

(Continued)

OTHER PUBLICATIONS

Stein, Jeff, The Random House Collecge Dictionary 1980, Random House, Section B.*

*Primary Examiner*—Tracy Dove
*Assistant Examiner*—Helen O. Chu
(74) *Attorney, Agent, or Firm*—David W. Schumaker

(57) ABSTRACT

The present invention discloses a fuel cell having at least one bi-cell. The bi-cells may be stacked in series to achieve a desired power output. Each bi-cell is a unit cell comprising two hydrogen electrodes, two air/oxygen electrodes, two electrolyte distributors and a gas diffuser. The hydrogen electrodes are disposed adjacent to one another and the air/oxygen electrodes are disposed on the outside ends of the hydrogen electrodes. An electrolyte distributor is disposed between each adjacently set hydrogen electrode and air/oxygen electrode. A gas diffuser/distributor is disposed between the hydrogen electrodes. An elastomeric material is injected between the electrodes and distributors to provide mechanical stability. Further, the entire bi-cell is over-molded with an elastomeric material. Ribs are set in the distributors to prevent the elastomeric material from flowing into areas designed for electrolyte flow, hydrogen flow and mechanical restraints and to promote uniform spacing between the various components. When the bi-cell units are stacked and secured, sufficient openings for air are formed to allow air to contact the air/oxygen electrodes.

20 Claims, 15 Drawing Sheets

U.S. PATENT DOCUMENTS

| | | | |
|---|---|---|---|
| 5,900,330 A * | 5/1999 | Kagatani | 429/17 |
| 6,998,184 B2 * | 2/2006 | Venkatesan et al. | 429/9 |
| 2004/0126634 A1 * | 7/2004 | Hatoh et al. | 429/22 |

FOREIGN PATENT DOCUMENTS

GB      2163595 A * 2/1986

* cited by examiner

AIR BREATHING FUEL CELL HAVING BI-CELL UNIT CELLS

RELATED APPLICATIONS

The application is filed under 37 CFR 1.53 as a continuation-in-part application of application Ser. No. 10/364,978 filed on Feb. 12, 2003 now abandoned, which is hereby incorporated herein by reference.

FIELD OF THE INVENTION

The present invention generally relates to fuel cells. More particularly, the present invention relates to a bi-cell fuel cell that implements an air breathing air electrodes, thus, eliminating the need for forced air. Further, the present invention discloses a fuel cell having bi-cell subassemblies connected in series, wherein an elastomeric material mechanically supports the electrodes and distributors of the bi-cells. eliminating the need for electrode frames and allows three dimensional expansion capability for the electrodes as the electrodes expand and contract during the operation of the fuel cell.

BACKGROUND OF THE INVENTION

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention is another product, which is essential to shortening that period to a matter of years. In the near term, hydrogen will be used in fuel cells for cars, trucks and industrial plants, just as it already provides power for orbiting spacecraft. But, with the problems of storage and infrastructure solved (see U.S. Pat. No. 6,305,442, entitled "A Hydrogen-based Ecosystem" issued on Oct. 23, 2001 to Ovshinsky, et al., which is hereby incorporated herein by reference and U.S. Pat. No. 6,193,929, entitled "High Storage Capacity Alloys Enabling a Hydrogen-based Ecosystem", issued on Feb. 27, 2001 to Ovshinsky et al., which is hereby incorporated herein by reference), hydrogen will also provide a general carbon-free fuel to cover all fuel needs.

A dramatic shift has now occurred, in which the problems of global warming and climate change are now acknowledged and efforts are being made to solve them. Therefore, it is very encouraging that some of the world's biggest petroleum companies now state that they want to help solve these problems. A number of American utilities vow to find ways to reduce the harm done to the atmosphere by their power plants. DuPont, one of the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." In fact, it is considered to be "THE" fuel for the future. Hydrogen is the most plentiful element in the universe (over 95%). Hydrogen can provide an inexhaustible, clean source of energy for our planet, which can be produced by various processes. Utilizing the inventions of subject assignee, the hydrogen can be stored and transported in solid state form in trucks, trains, boats, barges, etc. (see the '810 and '497 applications).

A fuel cell is an energy-conversion device that directly converts the energy of a supplied gas into an electric energy. Researchers have been actively studying fuel cells to utilize the fuel cell's potential high energy-generation efficiency. The base unit of the fuel cell is a cell having a cathode, an anode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Presently most of the fuel cell R & D focus is on P.E.M. (Proton Exchange Membrane) fuel cells. The P.E.M. fuel cell suffers from relatively low conversion efficiency and has many other disadvantages. For instance, the electrolyte for the system is acidic based. Thus, noble metal catalysts are the only useful active materials for the electrodes of the system. Unfortunately, not only are the noble metals costly, they are also susceptible to poisoning by many gases, and specifically carbon monoxide (CO). Also, because of the acidic nature of the P.E.M fuel cell, the remainder of the materials of construction of the fuel cell need to be compatible with such an environment, which again adds to the cost thereof. The proton exchange membrane itself is quite expensive, and because of its limited conductivity, inherently limits the power performance and operational temperature range of the P.E.M. fuel cell (the PEM is nearly non-functional at low temperatures, unlike the fuel cell of the instant invention). Also, the membrane is sensitive to high temperatures, and begins to soften at 120° C. The membrane's conductivity depends on water and dries out at higher temperatures, thus causing cell failure. Therefore, there are many disadvantages to the P.E.M. fuel cell, which make it somewhat undesirable for commercial/consumer use.

The conventional alkaline fuel cell has some advantages over P.E.M. fuels cells in that they have higher operating efficiencies, they use less expensive materials of construction, and they have no need for expensive membranes. The alkaline fuel cell also has relatively higher ionic conductivity in the electrolyte, therefore it has a much higher power capability. Unfortunately, conventional alkaline fuel cells still suffer from certain disadvantages. For instance, conventional alkaline fuel cells still use expensive noble metals catalysts in both electrodes, which, as in the P.E.M. fuel cell, are susceptible to gaseous contaminant poisoning. While the conventional alkaline fuel cell is less sensitive to temperature than the PEM fuel cell, the platinum active materials of conventional alkaline fuel cell electrodes become very inefficient at low temperatures.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous hydrogen electrode and oxygen electrode and brought into surface contact with the electrolytic solution. The particular materials utilized for the hydrogen electrode and oxygen electrode are important since they must act as efficient catalysts for the reactions taking place.

In an alkaline fuel cell, the reaction at the hydrogen electrode occurs between the hydrogen fuel and hydroxyl ions ($OH^-$) present in the electrolyte, which react to form water and release electrons:

$$H_2 + 2OH^- \rightarrow 2H_2O + 2e^-.$$

At the oxygen electrode, the oxygen, water, and electrons react in the presence of the oxygen electrode catalyst to reduce the oxygen and form hydroxyl ions ($OH^-$):

$$O_2 + 2H_2O + 4e^- \rightarrow 4OH^-.$$

The flow of electrons is utilized to provide electrical energy for a load externally connected to the hydrogen and oxygen electrodes.

The hydrogen electrode catalyst of the alkaline fuel cell splits molecular hydrogen to atomic hydrogen. The electrocatalyst then accelerates the oxidation reaction of the atomic hydrogen to release electrons. The overall reaction can be seen as (where M is the catalyst):

$$M + H_2 \rightarrow 2M \ldots H \rightarrow M + 2H^+ + 2e^-.$$

Thus the hydrogen electrode catalyst must efficiently dissociate molecular hydrogen into atomic hydrogen. Using conventional hydrogen electrode material, the dissociated hydrogen atoms are transitional and the hydrogen atoms can easily recombine to form molecular hydrogen if they are not used very quickly in the oxidation reaction. With the hydrogen storage electrode materials of the inventive instant startup fuel cells, the atomic hydrogen is immediately captured and stored in hydride form, and then used as needed to provide power.

In addition to being catalytically efficient on both interfaces, the catalytic material must be resistant to corrosion in the alkaline electrolyte environment. Without such corrosion resistance, the electrodes would quickly lose efficiency and the cell will die.

One prior art fuel cell anode catalyst is platinum. Platinum, despite its good catalytic properties, is not very suitable for wide scale commercial use as a catalyst for fuel cell anodes, because of its very high cost. Also, noble metal catalysts like platinum, cannot withstand contamination by impurities normally contained in the hydrogen fuel stream. These impurities can include carbon monoxide, which may be present in hydrogen fuel.

The above contaminants can cause what is commonly referred to as a "poisoning" effect. Poisoning occurs where the catalytically active sites of the material become inactivated by poisonous species invariably contained in the fuel cell. Once the catalytically active sites are inactivated, they are no longer available for acting as catalysts for efficient hydrogen oxidation reaction at the anode. The catalytic sites of the anode therefore are reduced since the overall number of available catalytically active sites is significantly lowered by poisoning. In addition, the decrease in catalytic activity results in increased over-voltage at the anode and hence the cell is much less efficient adding significantly to the operating loss. Over-voltage is the difference between the actual working electrode potential and it's equilibrium value. The physical meaning of over-voltage is the voltage required to overcome the resistance to the passage of current at the surface of the anode (charge transfer resistance). The over-voltage represents an undesirable energy loss, which adds to the operating loss of the fuel cell.

In related work, U.S. Pat. No. 4,623,597 entitled "Rechargeable Battery and Electrode Used Therein" issued Nov. 18, 1986 to Sapru et al. (hereinafter "the '597 patent") and others in it's lineage, which is hereby incorporated herein by reference, one of the present inventors, Stanford R. Ovshinsky, described disordered multi-component hydrogen storage materials for use as negative electrodes in electrochemical cells for the first time. In this patent, Ovshinsky describes how disordered materials can be tailor made (i.e., atomically engineered) to greatly increase hydrogen storage and reversibility characteristics. Such disordered materials are amorphous, microcrystalline, intermediate range order, and/or polycrystalline (lacking long range compositional order) wherein the polycrystalline material includes topological, compositional, translational, and positional modification and disorder. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed the batteries to be utilized most advantageously as secondary batteries, but also as primary batteries.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. Disorder permits degrees of freedom, both of type and of number, within a material, which are unavailable in conventional materials. These degrees of freedom dramatically change a materials physical, structural, chemical and electronic environment. The disordered material of the '597 patent have desired electronic configurations which result in a large number of active sites. The nature and number of storage sites were designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods there between resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of electro-catalytically active sites and hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

Disorder can be of an atomic nature in the form of compositional or configurational disorder provided throughout the bulk of the material or in numerous regions of the material. The disorder also can be introduced by creating microscopic phases within the material, which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces, which are rich in local chemical environments, which provide numerous desirable sites for electrochemical hydrogen storage. These same principles can be applied within a single structural phase. For example, compositional disorder is introduced into the material, which can radically alter the material in a planned manner to achieve improved and unique results, using the Ovshinsky principles of disorder on an atomic or microscopic scale.

In an attempt to overcome some deficiencies in the prior art, U.S. Pat. No. 6,468,682 issued to Fuglevand et al. on Oct. 22, 2002 (hereinafter "'682 patent") discloses an ion exchange membrane fuel cell, which includes a module enclosing a membrane electrode diffusion assembly which has an active area defined by a surface area. Further, the '682 patent discloses an ion exchange membrane fuel cell power system having a plurality of discrete ion exchange membrane fuel cell modules which can be manipulated by hand. The modules described receive mechanical support from sidewalls, ribs and a backplate. However, the '682 patent does not disclose an alkaline fuel cell having individual bi-cell subassemblies overmolded with elastomeric material. The term "rib" or "ribs" is used in the '682 patent, but the description and use of that term in the '682 patent in entirely distinguishable from the manner in which that term is used in the present invention, as is described in detail below. Further, the ribs utilized in the '682 patent are not used as seals to prevent elastomeric material from flowing into undesirable areas.

The present invention solves problems of current fuel cell designs through the use of overmolded bi-cell subassemblies mechanically supported with elastomeric material. Each bi-cell subassembly forms a unit cell and the unit cells may be stacked in series to achieve a desired power output and the elastomeric material is sufficiently flexible to allow for the three dimensional expansion of the electrodes without damage to the electrodes.

SUMMARY OF THE INVENTION

An embodiment of the present invention comprises a fuel cell having at least one bi-cell. Each bi-cell comprises two hydrogen electrodes, two air/oxygen electrodes, two electrolyte distributors and a gas diffuser. A first hydrogen electrode has a hydrogen contacting surface and an electrolyte contacting surface and a second hydrogen electrode has a hydrogen contacting surface and an electrolyte contacting surface. The hydrogen contacting surface of the first hydrogen electrode is disposed adjacent to the hydrogen contacting surface of the second hydrogen electrode. A first air electrode has an air contacting surface and an electrolyte contacting surface, wherein the electrolyte contacting surface of the first air electrode is disposed adjacent to the electrolyte contacting surface of the first hydrogen electrode. A second air electrode has an air contacting surface and an electrolyte contacting surface, wherein the electrolyte contacting surface of the second air electrode is disposed adjacent to the electrolyte contacting surface of the second hydrogen electrode. A first electrolyte distributor is disposed between the electrolyte contacting surface of the first air electrode and the electrolyte contacting surface of the first hydrogen electrode. A second electrolyte distributor is disposed between the electrolyte contacting surface of the second air electrode and the electrolyte contacting surface of the second hydrogen electrode. A gas diffuser is disposed between the hydrogen contacting surface of the first hydrogen electrode and the hydrogen contacting surface of the second hydrogen electrode.

A preferred embodiment of the present invention incorporates ribs into the electrolyte distributors and gas diffusers to provide seals between the respective hydrogen and electrolyte flow areas of the bi-cell and elastomeric material injected between the electrodes. The first electrolyte distributor has a first side and a second side, wherein each of the sides of the first electrolyte distributor has an electrolyte rib. The electrolyte rib of the first side of the first electrolyte distributor provides a seal for a first air electrode electrolyte inlet, the first air electrode electrolyte contacting surface and a first air electrode electrolyte outlet. The electrolyte rib of the second side of the first electrolyte distributor provides a seal for a first hydrogen electrode electrolyte inlet, the first hydrogen electrode electrolyte contacting surface and a first hydrogen electrode electrolyte outlet. The second electrolyte distributor has a first side and a second side, wherein each of the sides of the second electrolyte distributor having an electrolyte rib, the electrolyte rib of the first side of the second electrolyte distributor provides a seal for a second air electrode electrolyte inlet, the second air electrode electrolyte contacting surface and a second air electrode electrolyte outlet. The electrolyte rib of the second side of the second electrolyte distributor provides a seal for a second hydrogen electrode electrolyte inlet, the second hydrogen electrode electrolyte contacting surface and a second hydrogen electrode electrolyte outlet.

The gas diffuser has a first side and a second side, wherein each of the first and second gas diffuser sides has a hydrogen rib. The hydrogen rib of the first side of the gas diffuser provides a seal for a first hydrogen electrode hydrogen inlet, the first hydrogen electrode hydrogen contacting surface and a first hydrogen electrode hydrogen outlet. The hydrogen rib of the second side of the gas diffuser provides a seal for a second hydrogen electrode hydrogen inlet, the second hydrogen electrode hydrogen contacting surface and a second hydrogen electrode hydrogen outlet.

In a preferred embodiment, each of the electrolyte distributors has a plurality of pins disposed between each of the electrolyte distributors and each of the electrodes. The pins provide structural support and uniform spacing between each of the electrodes and each of the electrolyte distributors as the elastomeric material is injected. Similarly, the gas diffuser has a plurality of pins disposed between the gas diffuser and each of the hydrogen electrodes, wherein the pins provide structural support and uniform spacing between each of the hydrogen electrodes and the gas diffuser.

The air contacting surfaces of each of the air electrodes are adjacent to an air flow-through passageway. A non-forced supply of air enters and exits the air flow-through passageway via thermal convection and/or an oxygen concentration gradient between outside air and oxygen depleted air within the fuel cell stack. The air flow-through passageway may be formed between the oxygen contacting surfaces of two of the air electrodes. Each of the air electrodes may be sealed in an air electrode frame exposing the air contacting surface and the electrolyte contacting surface of the air electrode.

The fuel cell pack further comprises a hydrogen supply subsystem and a protective casing. The protective casing has a plurality of openings through which air enters and exits the fuel cell pack via thermal convection and/or an oxygen concentration gradient between outside air and oxygen depleted air within the fuel cell stack. The hydrogen supply subsystem is in gaseous communication with the fuel cell stack. The hydrogen supply subsystem is adapted to receive a supply of hydrogen from at least one hydrogen storage container and distribute the supply of hydrogen to the fuel cell stack. The hydrogen storage containers are adapted to store hydrogen in a liquid form, gaseous form, a chemical hydride form, and/or a metal hydride form. When the hydrogen storage container stores hydrogen in a metal hydride form, the hydrogen storage container may be placed in thermal contact with a non-forced stream of heated air exiting the top of the fuel cell stack via convection to aid in desorption of hydrogen from the metal hydride. The electrolyte circulating loop may also be adapted to provide heat to the hydrogen storage containers to aid in desorption of hydrogen from the metal hydride.

An embodiment of the present invention provides an alkaline fuel cell that incorporates at least one bi-cell having air electrodes capable of operating at atmospheric pressure and hydrogen electrodes capable of operating at near atmospheric pressure.

An embodiment of the present invention provides an alkaline fuel cell incorporating non-noble metal catalysts and utilizes electrodes having no frames.

An embodiment of the present invention provides a fuel cell that incorporates electrolyte distributors having electrolyte flow channels specifically designed to evenly distribute the electrolyte.

An embodiment of the present invention provides an alkaline fuel cell incorporating electrolyte distributors and gas diffusers having ribs that create a seal for gas/electrolyte inlets and outlets, mechanical restraints and reactive areas for hydrogen gas and electrolyte.

An embodiment of the present invention provides an alkaline fuel cell incorporating bi-cell units that incorporate an elastomeric material, such as an alloy of EPDM and polypropylene, wherein the elastomeric material provides a sealing system and mechanical support for the electrodes, electrolyte distributors and gas diffuser.

An embodiment of the present invention provides an alkaline fuel cell incorporating bi-cell units that may be stacked together to achieve a desired power output and wherein the bi-cell units may be stacked together using a tongue and groove design or other interconnecting design.

An embodiment of the present invention provides a method of making a fuel cell having bi-cell units, wherein the bi-cell units are produced by injecting an elastomeric material into a bi-cell mold, so that the elastomeric material provides mechanical support for the bi-cell, but the flow of elastomeric material during the injecting is restricted to desired areas around and between the bi-cell electrodes and distributors.

BRIEF DESCRIPTION OF THE DRAWINGS

In order to assist in the understanding of the various aspects of the present invention and various embodiments thereof, reference is now be made to the appended drawings, in which like reference numerals refer to like elements. The drawings are exemplary only, and should not be construed as limiting the invention.

DETAILED DESCRIPTION OF THE INVENTION

Figure 1:
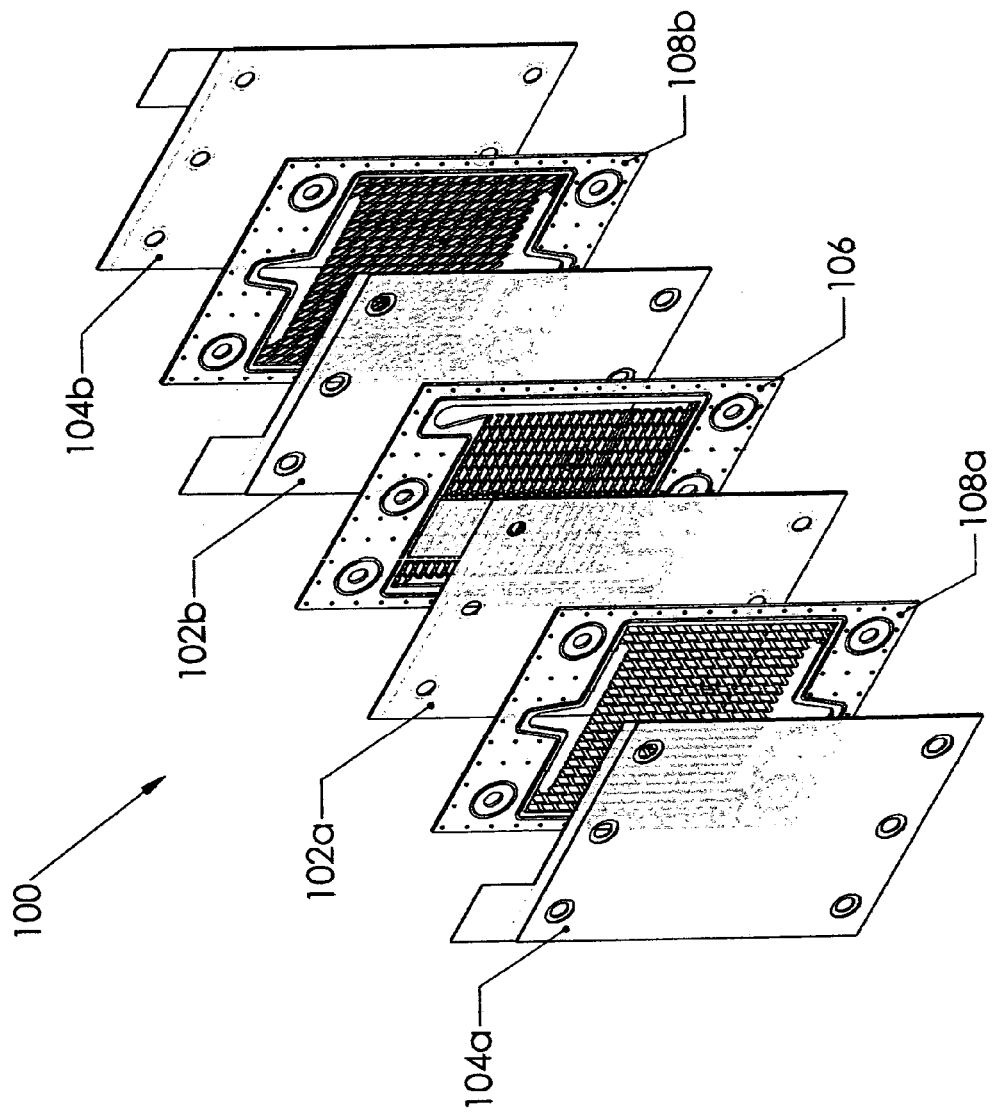
FIG. 1 is an exploded view of an embodiment of the bi-cell unit cell subassembly of the present invention including two hydrogen electrodes, two air/oxygen electrodes, a gas diffuser/distributor and two electrolyte distributors.

The present invention comprises a fuel cell pack including the use of bi-cells, which may be connected in series to provide a desired power output. Referring to FIG. 1, each bi-cell subassembly is a unit cell, generally referred to as 100, comprising two hydrogen electrodes 102a and 102b, two air/oxygen electrodes 104a and 104b, a gas diffuser/distributor 106 and two electrolyte distributors 108a and 108b. The need for electrode frames is eliminated by aligning the unit cell subassembly and injecting an elastomeric material, such as SANTROPENE® (a alloy of EPDM and polypropylene), into discreet regions in between the electrodes and distributors and overmolding the unit cell subassembly with the elastomeric material to provide the unit cell with mechanical support. Additionally, the present invention comprises a fuel cell pack with non-forced air and electrolyte circulation. The fuel cell pack is capable of providing a high power output without having forced high flow rates of hydrogen, oxygen/air, or electrolyte, thus eliminating the need for any pumping devices. Non-forced air and electrolyte circulation allow the fuel cell pack to be operated at ambient temperatures and pressures. Air enters and exits the fuel cell stack via thermal convection and/or an oxygen concentration gradient between outside air and oxygen depleted air contained within the fuel cell stack. Electrolyte is circulated throughout the fuel cell via thermal convection and/or gravity. During operation, utilizing the density difference between hot and cold electrolyte, hot electrolyte flows upwards through the fuel cell pack while cooler electrolyte flows downward thereby providing non-forced convectional electrolyte circulation utilized for operation of the fuel cell pack. During operation of the fuel cell pack, cool air enters the fuel cell pack through the bottom and sides via thermal convection and/or the oxygen concentration gradient, is heated by the energy dissipated by the electrodes ($I^2R$ heating), and exits through the top of the fuel cell pack thereby providing non-forced circulation of air through the fuel cell pack.

As used herein the term "non-forced", when referring to a gaseous or liquid stream, refers to the circulation of the stream throughout the fuel cell pack without the use of pumps or other pumping devices e.g. fans, blowers, etc. As used herein the term "thermal convection" refers to the transfer of heat through a fluid caused by molecular motion resulting in the circulation of such fluid.

Figure 3A:
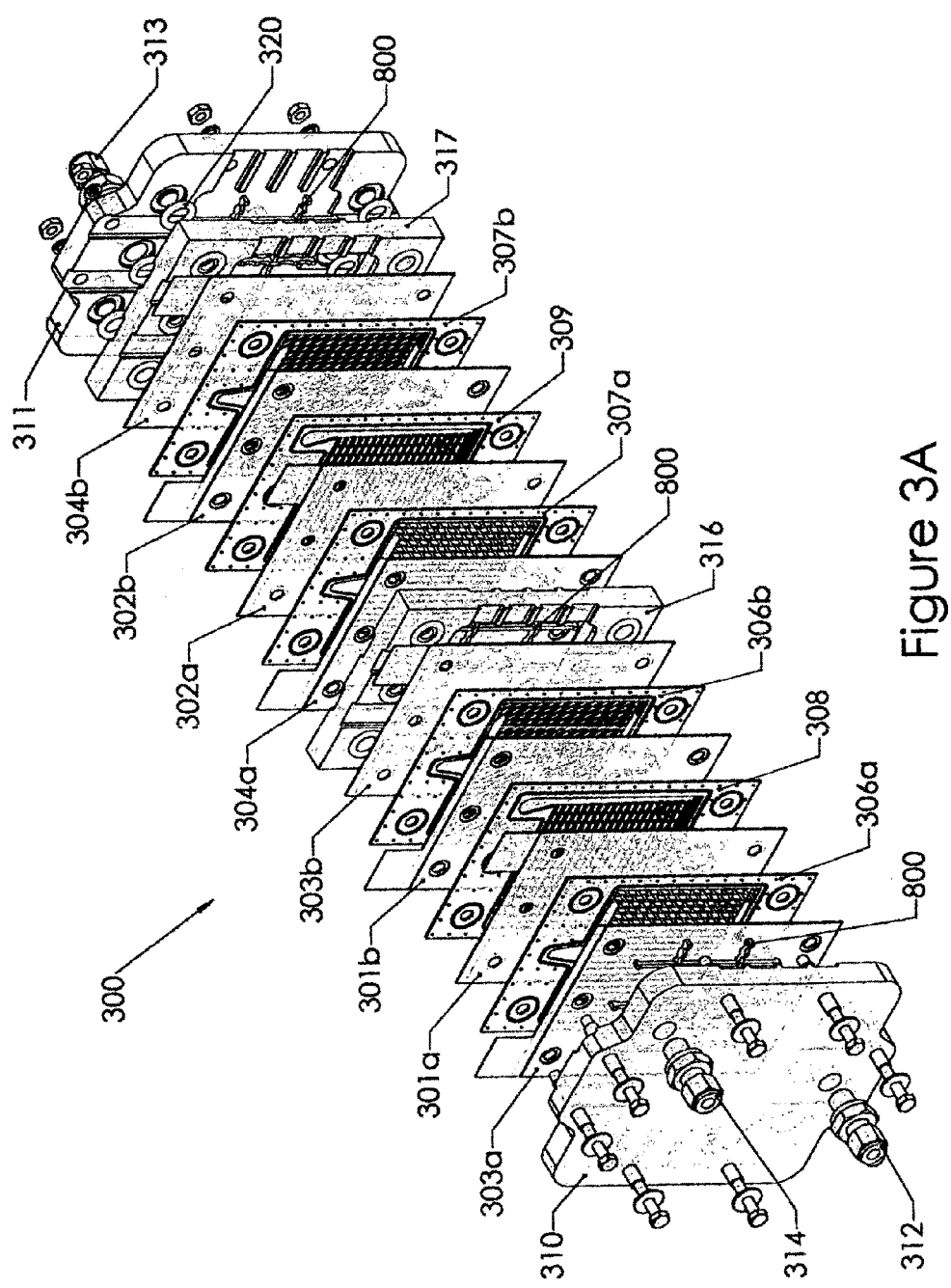
FIG. 3A is an exploded view of an embodiment of the air breathing bi-cell fuel cell of the present invention having two bi-cell unit cells secured by endplates and bolts.

A view of an embodiment of a fuel cell stack in accordance with the present invention is an exploded view of the fuel cell depicted in FIG. 3A, generally as 300. The layers of the fuel cell stack 300 have openings through which hydrogen and electrolyte reach the hydrogen electrodes 301a, 301b, 302a and 302b and openings through which electrolyte reach the air electrodes 303a, 303b, 304a and 304b, as illustrated in FIG. 3A. When the layers are stacked and pressed together, the holes of each layer line up to allow uninterrupted flow throughout the cell 300. Air reaches the oxygen electrodes 303a, 303b, 304a and 304b through openings in the fuel cell stack 300, as explained below. The fuel cell stack 300 is easily expandable as dictated by design requirements by incorporating additional bi-cell subassemblies to achieve desired power output requirements. The layers of each bi-cell unit of the fuel cell stack 300 are bonded together using elastomeric material or other adhesive agents such that all layers are sealed together to limit hydrogen, air, and electrolyte movement to specific regions within the fuel cell stack 300. An electrolyte distributor 306a, 306b, 307a and 307b is set between each adjacently disposed air electrode and hydrogen electrode and a gas diffuser/distributor 308 and 309 is set between adjacently disposed hydrogen electrodes. A front end plate 310 and a back end plate 311 may be secured adjacent to the outermost air electrodes 303a and 304b to provide mechanical stability. Further, the front endplate may be designed with an electrolyte inlet 312 and a hydrogen inlet 314 and the back endplate may be designed with an electrolyte outlet 313 and a hydrogen outlet (not shown). The endplates 310 and 311 are then secured to one another with bolts, washers and nuts 302 with the bi-cells and air electrodes spacers 800 secured between the endplates. Elastomeric material overmold 316 and 317 provides mechanical stability for each bi-cell unit and sufficient openings to allow air to contact the air electrodes 303a, 303b, 304a and 304b. It should be noted that electrodes and distributors are contained within the overmold 316 and 317 to form bi-cell units, as explained in more detail below. The fuel cell stack 300 of FIG. 3A illustrates two bi-cell units contained within the fuel cell stack 300.

Figure 3B:
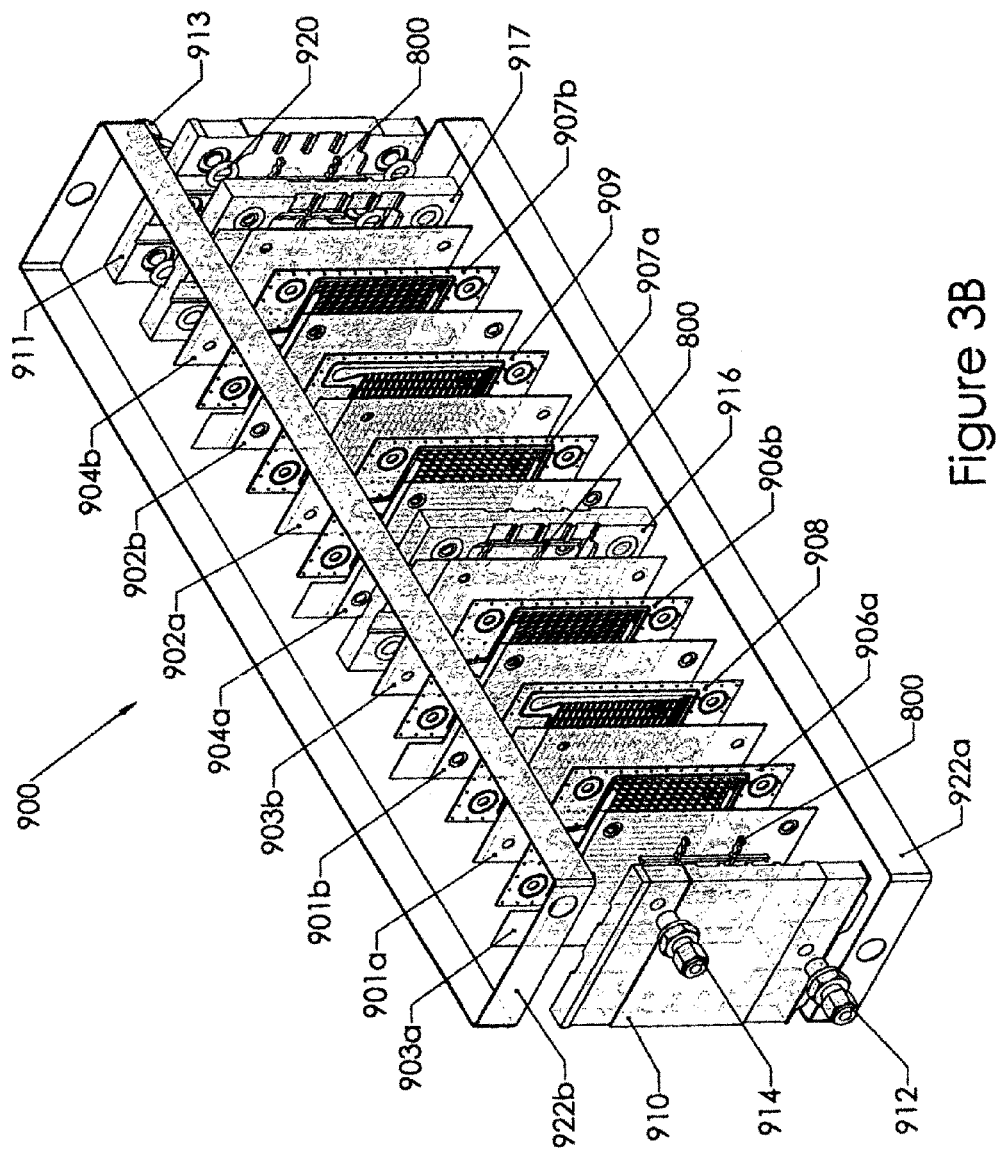
FIG. 3B is an exploded view of an embodiment of the air breathing bi-cell fuel cell of the present invention having two bi-cell unit cells secured by endplates and belts.

FIG. 3B illustrates an exploded view of a fuel cell having two bi-cell units, which is secured by two belts, generally referred to as 900. The layers of the fuel cell stack 900 have openings through which hydrogen and electrolyte reach the hydrogen electrodes 901a, 901b, 902a and 902b and openings through which electrolyte reach the air electrodes 903a, 903b, 904a and 904b, as illustrated in FIG. 3B. When the layers are stacked and pressed together, the holes of each layer line up to allow uninterrupted flow throughout the cell 900. Air reaches the oxygen electrodes 903a, 903b, 904a and 904b through openings in the fuel cell stack 900, as explained below. The fuel cell stack 900 is easily expandable as dictated by design requirements by incorporating additional bi-cell subassemblies to achieve desired power output requirements. The layers of each bi-cell unit of the fuel cell stack 900 are bonded together using elastomeric material or other adhesive agents such that all layers are sealed together to limit hydrogen, air, and electrolyte movement to specific regions within the fuel cell stack 900. An electrolyte distributor 906a, 906b, 907a and 907b is set between each adjacently disposed air electrode and hydrogen electrode and a gas diffuser/distributor 908 and 909 is set between adjacently disposed hydrogen electrodes. An air electrode spacer 800 may be set between adjoining bi-cell units. Additionally, an air electrode spacer may be set between an outer most bi-cell and endplate. A front end plate 910 and a back end plate 911 may be secured adjacent to the outermost air electrodes 903a and 904b to provide mechanical stability. Further, the front endplate may be designed with an electrolyte inlet 912 and a hydrogen inlet 914 and the back endplate may be designed with an electrolyte outlet 913 and a hydrogen outlet (not shown). Steel belts 920a and 920b are wrapped around the bi-cell units to secure the fuel cell 900. Elastomeric material overmold 916 and 917 provides mechanical stability for each bi-cell unit and sufficient openings to allow air to contact the air electrodes 903a, 903b, 904a and 904b. It should be noted that electrodes and distributors are contained within the overmold 916 and 917 to form bi-cell units, as explained in more detail below.

Figure 8:
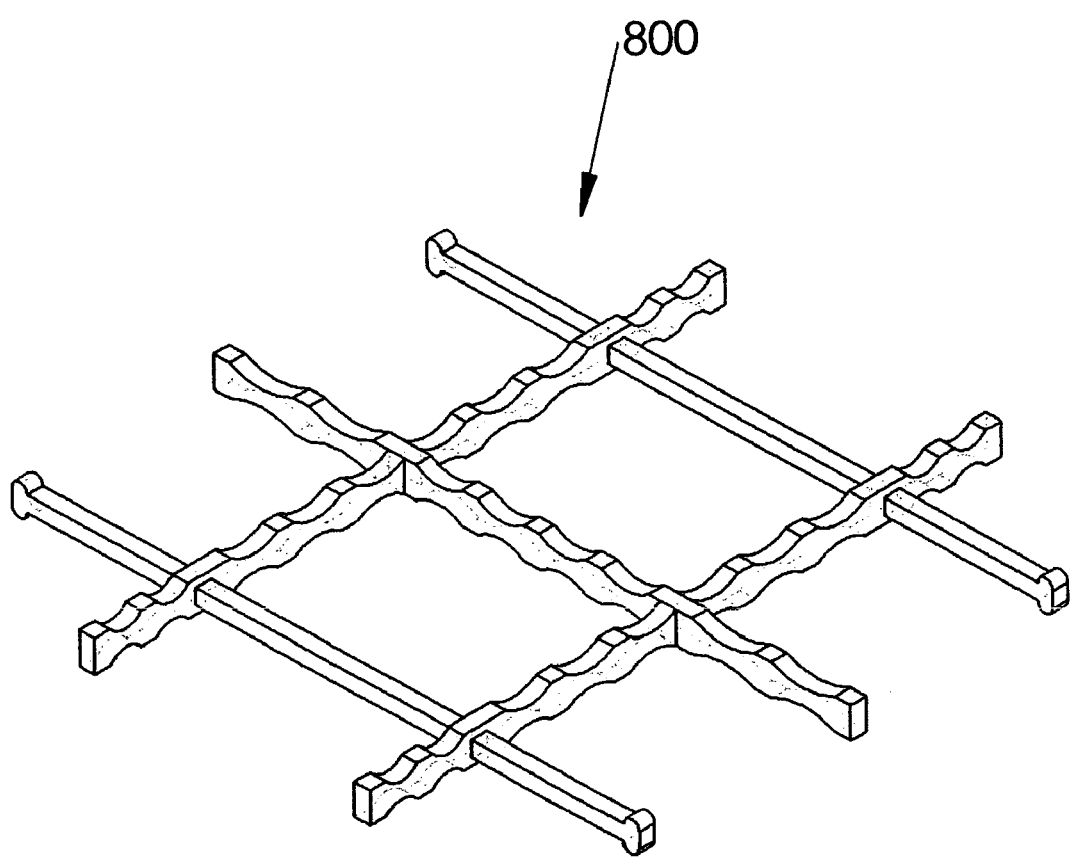
FIG. 8 is an illustration of an air electrode spacer of an embodiment of the present invention.

Referring to FIG. 8, an air electrode spacer, referred to generally as 800, may be set between adjoining bi-cell units. Additionally, an air electrode spacer may be set between an outer most bi-cell and adjoining endplate. The air electrode spaces ensure that a sufficient distance is maintained to allow air to contact the air electrode. The preferred construction material of the air electrode spacers is any material that may withstand the temperatures of the system and absorb expansion of the electrodes. The construction material of the air electrode spacer 800 may be any plastic that meets the above criteria. The preferred construction material is polypropylene, but other plastics, such as polyethylene or nylon, may be used.

Figures 2A, 2B:
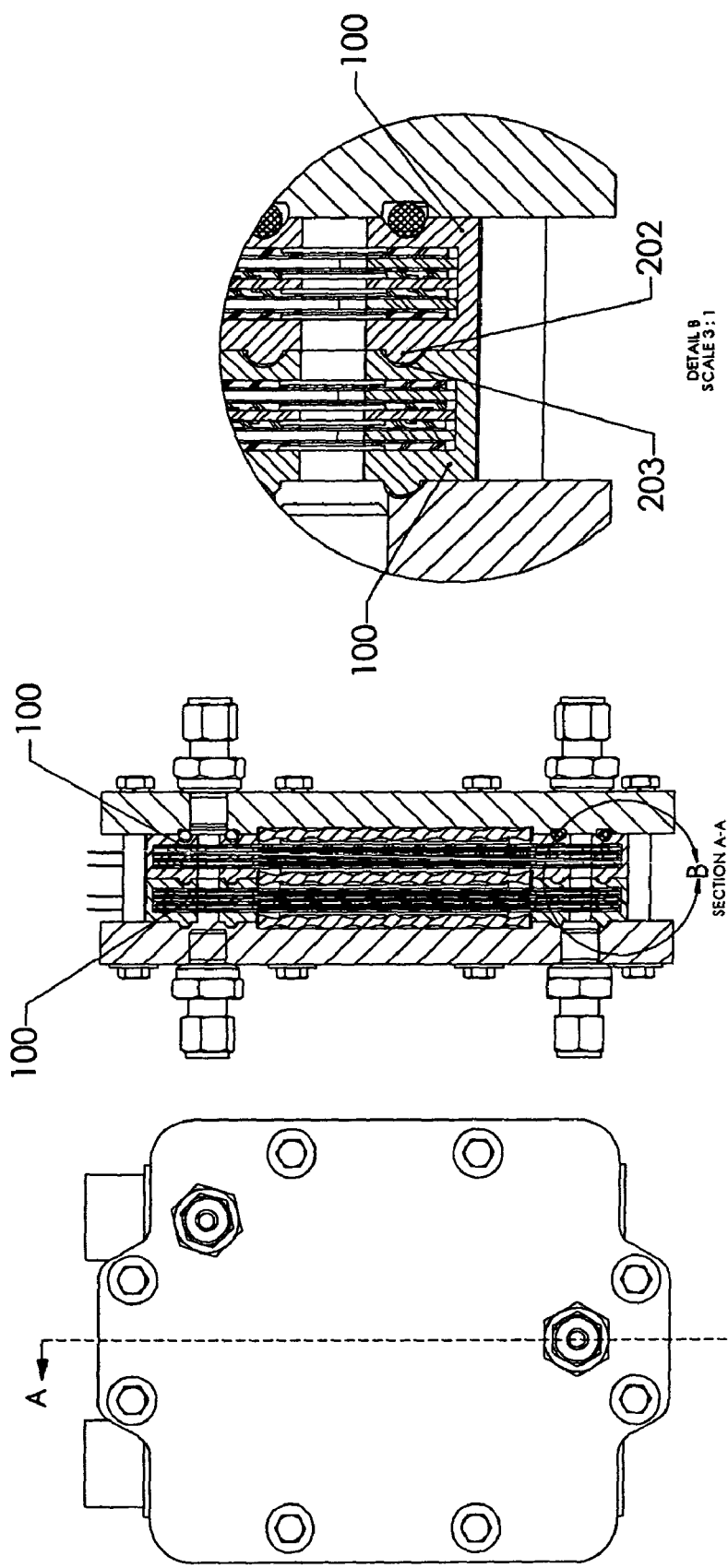
FIG. 2A is a schematic cross section of an embodiment of a fuel cell of the present invention having two the bi-cell unit cells taken along line A-A to show the interconnection of the bi-cell units.
FIG. 2B is a magnified illustration of B of FIG. 2A that illustrates an embodiment of the bi-cell unit cell subassembly of the present invention that shows the sealing bumps and sealing sag of the bi-sell unit cell.

Each bi-cell subassembly 100 comprises two air/oxygen electrodes 104A and 104B, two hydrogen electrodes 102A and 102B, one gas diffuser/distributor 106 and two electrolyte distributors 108A and 108B, as illustrated in FIG. 1 and FIG. 2A. The air/oxygen electrodes 104A and 104B are aligned on the outside ends of the bi-cell subassembly 100 to contact ambient air from the surrounding environment. The hydrogen electrodes 102A and 102B are set inside the air/oxygen electrodes 104A and 104B. The first electrolyte distributor 108A is set between the first air/oxygen electrode 104A and the first hydrogen electrode 102A and the second electrolyte distributor 108B is set between the second air/oxygen electrode 104B and the second hydrogen electrode 102B. A gas diffuser/distributor 106 is set between the hydrogen electrodes 102A and 102B.

Figure 6:
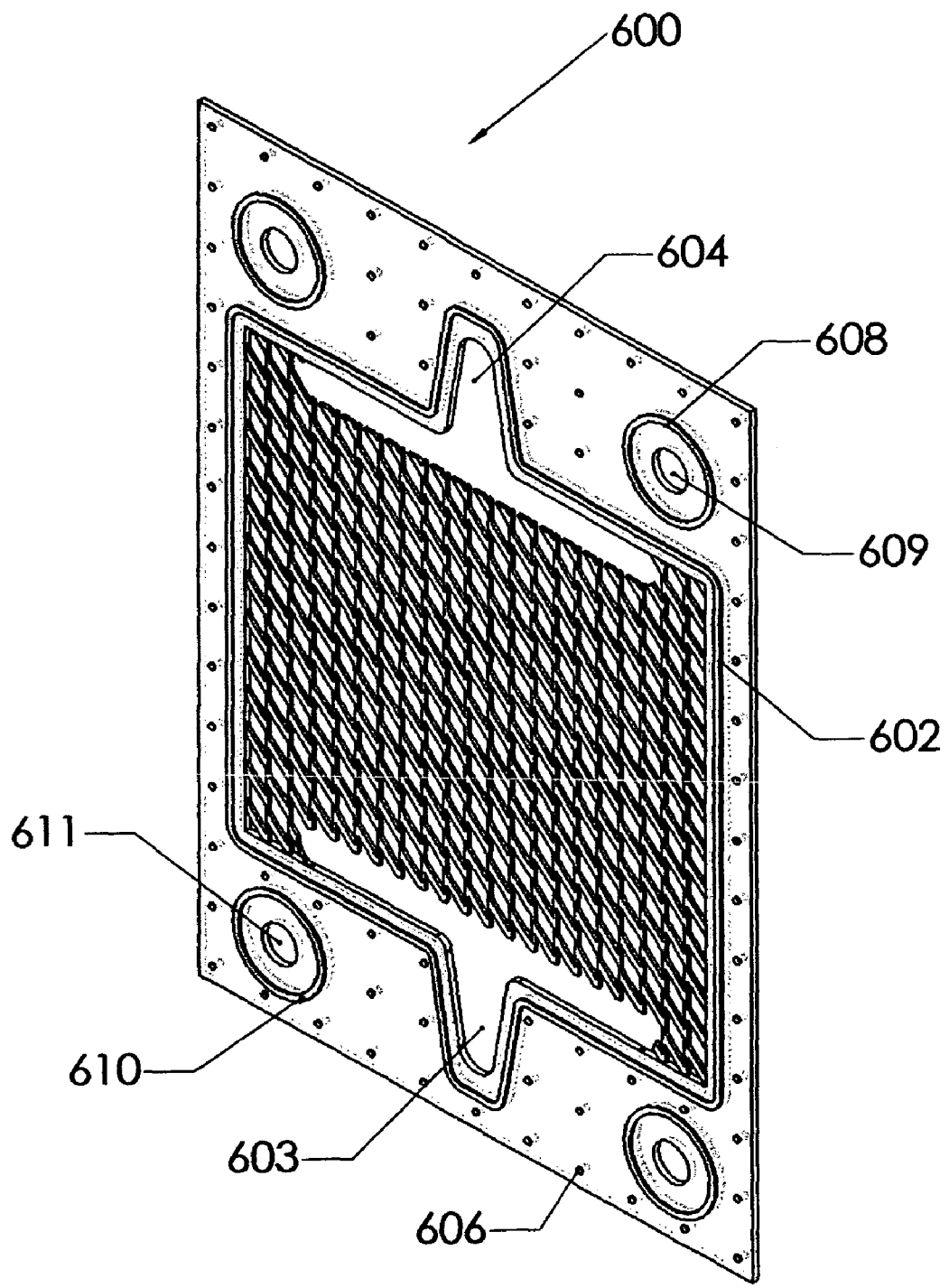
FIG. 6 is an illustration of an electrolyte distributor of an embodiment of the present invention that details ribs surrounding the electrolyte flow area and the hydrogen gas flow through holes.

In a preferred embodiment, the electrolyte distributors, referred to generally as 600, are designed with a rib 602 around the area established for electrolyte flow into 603 and out of 604 the reactive surface of the electrolyte distributor, as illustrated in FIG. 6. Preferably a rib for electrolyte flow is designed on both sides of the electrolyte distributor. The rib 602 establishes a space within the bi-cell subassembly to seal the area established for electrolyte flow. Additionally, the electrolyte distributor may have a rib 608 around a hole 609 designed for hydrogen to flow through to the gas diffuser/distributor and a rib 610 around each through hole 611. The holes 603, 604, 609 and 611 may also act as mechanical restraints for retractable pins in the mold cavity during the elastomeric material injection, as described in more detail below. As the bi-cell subassembly is held in position, elastomeric material is injected in between the electrodes to provide mechanical support and a well-integrated seal. The ribs 602, 608 and 610 prevent the flow of elastomeric material into areas designed for electrolyte flow, hydrogen flow and bolts. Preferably, the spaces between the respective electrodes and the electrolyte distributors established by the ribs 602, 608 and 610 are about 0.5 mm. To enable the space to be maintained during the injection process, small pins 606 may be dispersed throughout the non-reactive surface of both sides of the distributors 600, as illustrated in FIG. 6. The pins allow the elastomeric material to flow to the desired area and maintain a uniform spacing between the electrolyte distributor and the electrodes. The preferred dimension of the pins is a diameter of about 1.0-2.0 mm and a height of about 0.4 mm, however many designs and dimensions may be used to achieve the desired result. Preferably, the pins are integrated with the construction material of the electrolyte distributors and the preferred construction material of the pins is polypropylene. Preferably, the elastomeric material is injected simultaneously between the air electrodes and distributors and between the hydrogen electrodes and the distributors. The electrolyte is preferably an alkaline solution, which are well known in the art. Preferably, the electrolyte solution is a potassium hydroxide solution (KOH). In an alternative embodiment, pins are integrated into the electrodes.

Figure 7:
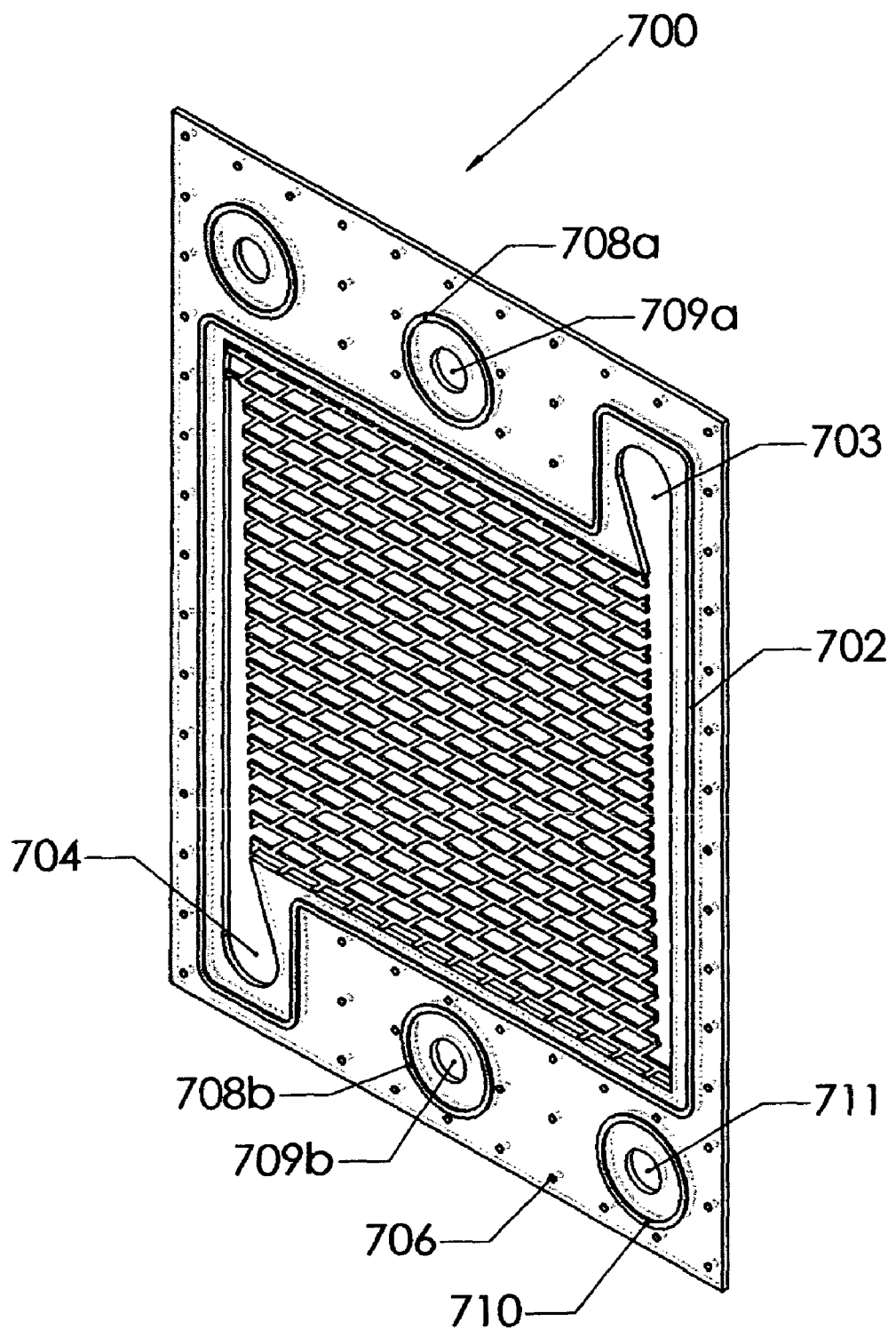
FIG. 7 is an illustration of a gas diffuser/distributor of an embodiment of the present invention that details ribs surrounding the hydrogen gas flow area and the electrolyte flow through holes.

Similar to the electrolyte distributors, the gas diffuser/distributor, referred to generally as 700, of each bi-cell is designed with a rib 702 around the area established for hydrogen flow into 703 and out of 704 the reactive surface of the gas diffuser/distributor 700, as illustrated in FIG. 7. The rib 702 establishes a space within the bi-cell subassembly to seal the area established for hydrogen flow. Additionally, the gas diffuser/distributor 700 may have ribs 708a and 708b around holes 709a and 709b designed for electrolyte to flow through to the electrolyte distributor and a rib 710 around each through hole 711. The holes 703, 704, 709a, 709b and 711 may also act as mechanical restraints for retractable pins in the mold cavity during the elastomeric material injection, as described in more detail below. As the bi-cell subassembly is held in position, elastomeric material is injected in between the electrodes to provide mechanical support and a well-integrated seal. The ribs 702, 708a, 708b and 710 prevent the flow of elastomeric material into areas designed for hydrogen flow, electrolyte flow and bolts. As the bi-cell subassembly is held in position, elastomeric material is injected in between the electrodes to provide mechanical support and a well-integrated seal. Preferably, the spaces between the hydrogen electrodes and distributor 700 established by the ribs 702, 708a, 708b and 710 is about 0.5 mm. To enable the spaces to be maintained during the injection process, small pins 706 may be dispersed throughout the non-reactive surface of both sides of the distributor 700, as illustrated in FIG. 7. The pins allow the elastomeric material to flow to the desired area and maintain a uniform spacing between the gas diffuser/distributor and the electrodes. Preferably, the pins are integrated with the construction material of the gas diffuser/distributor and the preferred construction material of the pins is polypropylene. The preferred dimension of the pins is a diameter of about 1.0-2.0 mm and a height of about 0.4 mm, however many designs and dimensions may be used to achieve the desired result. Preferably, the elastomeric material is injected simultaneously between the air electrodes and distributors and between the hydrogen electrodes and the distributors.

The hydrogen electrodes and the gas diffuser/distributor are sealed together to prevent any hydrogen from leaking out of the hydrogen chamber. Hydrogen enters the hydrogen chamber through a passage formed from a cutout section in the hydrogen electrode gas diffuser/distributor. Preferably, the gas diffuser/distributor equally distributes hydrogen over the entire hydrogen contacting surface of each hydrogen electrode in the bi-cell. The hydrogen electrode gas diffuser/ distributor may be adapted to distribute hydrogen across the hydrogen contacting surfaces of the hydrogen electrodes and provide mechanical support to the fuel cell stack. Preferably, the gas diffuser/distributor is formed with framed plastic mesh.

Figure 9:
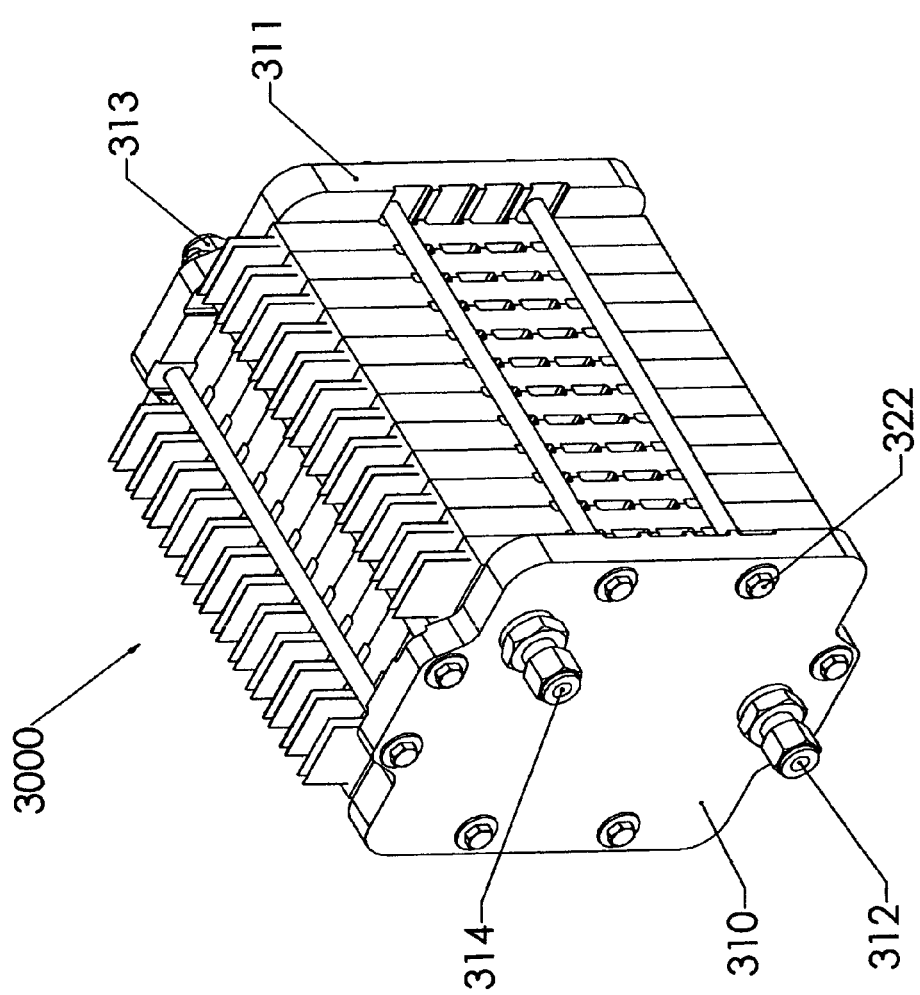
FIG. 9 is an illustration of a bi-cell fuel cell of an embodiment of the present invention secured with bolted end plates.
Figure 10:
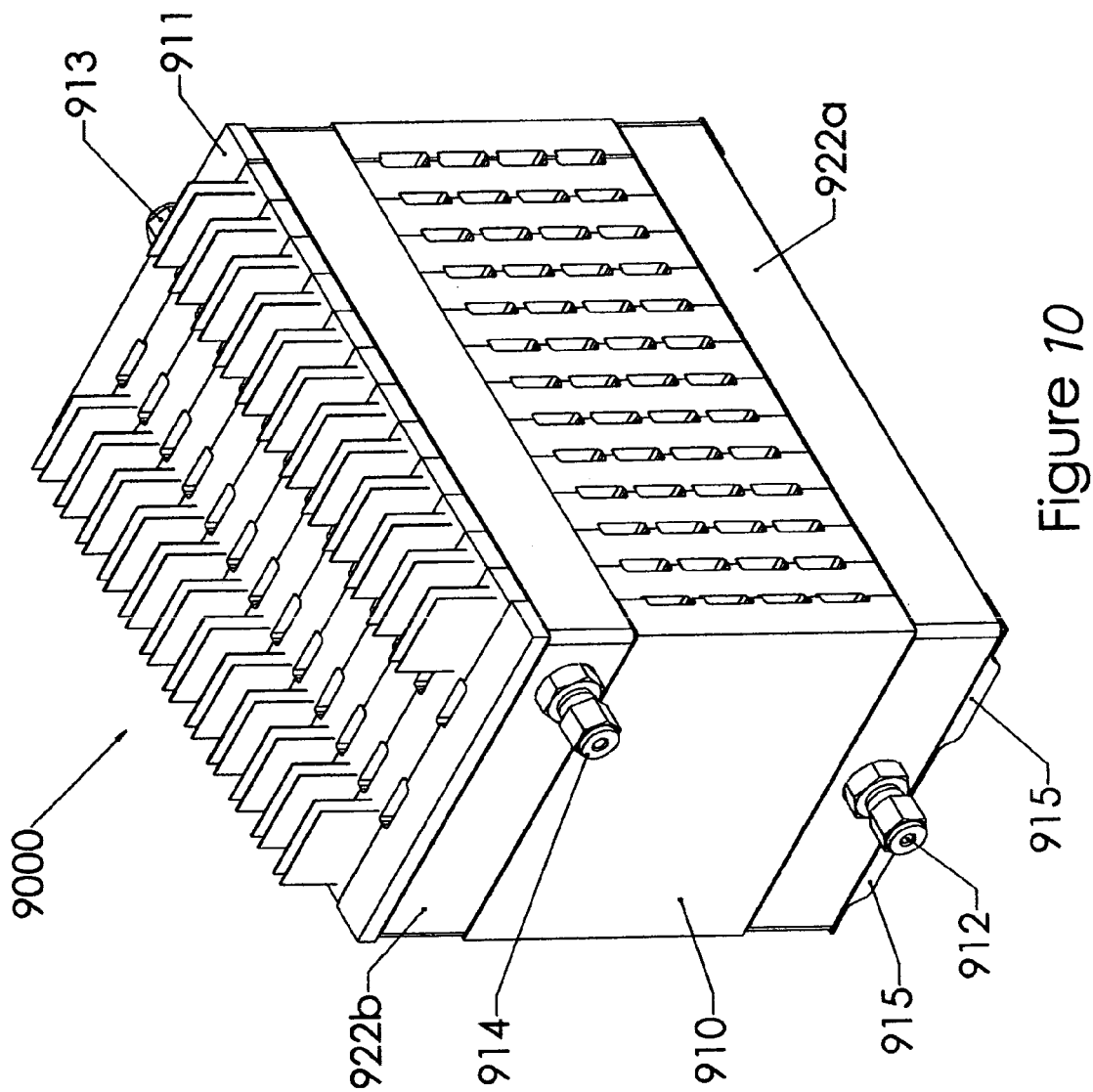
FIG. 10 is an illustration of a bi-cell fuel cell of an embodiment of the present invention secured with steel belts.
Figure 14:
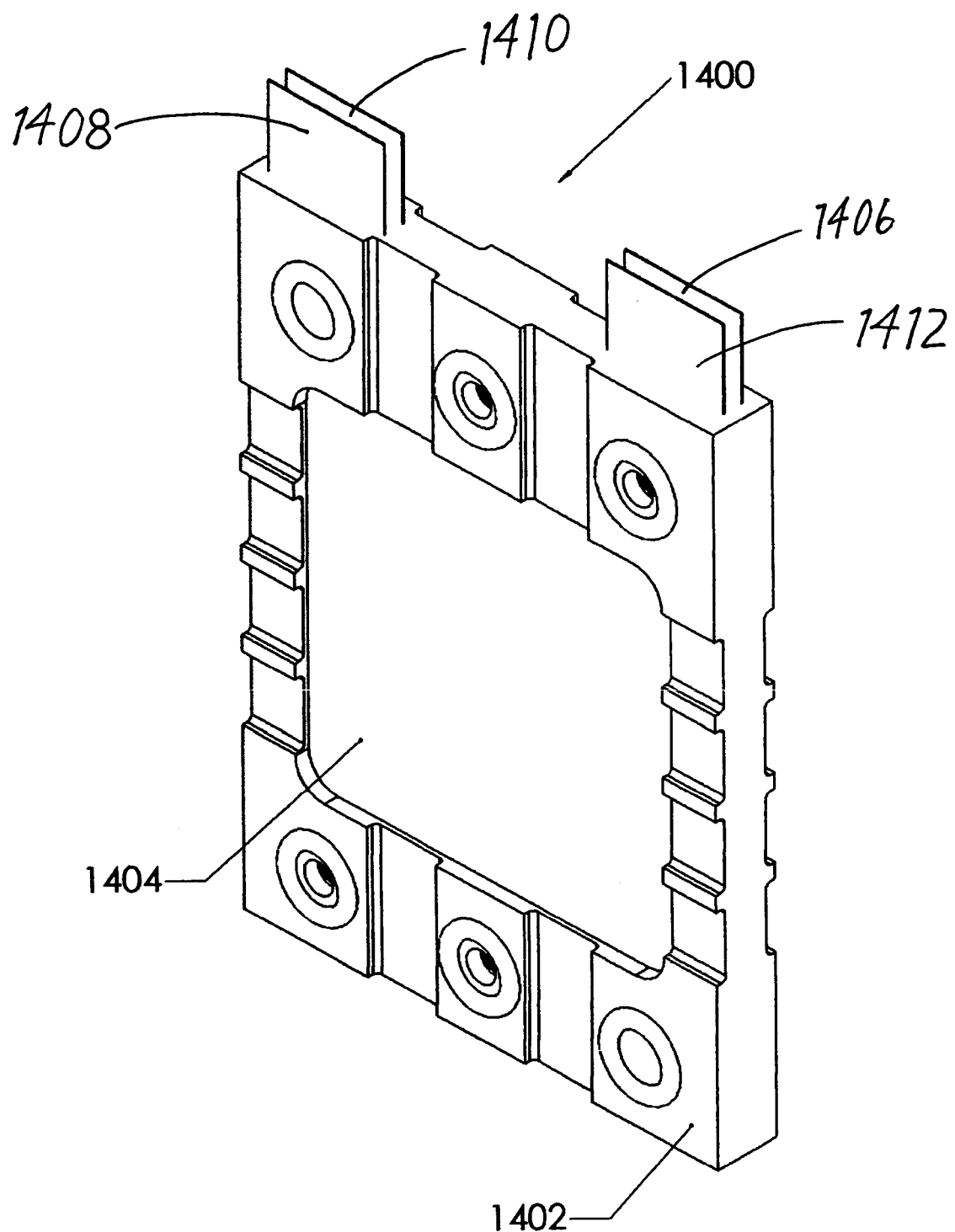
FIG. 14 is an illustration of an embodiment of the bi-cell unit cell subassembly of the present invention having an overmold of elastomeric material.

The entire bi-cell unit is overmolded with the elastomeric material to form the bi-cell unit for incorporation into the fuel cell of the present invention. The need for electrode frames is eliminated by aligning the unit cell subassembly and injecting an elastomeric material into discreet regions in between the electrodes and distributors and overmolding the unit cell subassembly, as illustrated in FIG. 14. The overmold 1402 produces a unit cell, referred to generally as 1400, in which the components of the unit cell subassembly (i.e. two hydrogen electrodes, two air/oxygen electrodes, a gas diffuser/distributor and two electrolyte distributors) are firmly stabilized and produces a unit cell that is stackable with other unit cells while maintaining a sufficient opening for the air/oxygen electrodes 1404 to contact ambient air. Additionally, the overmold of the bi-cell units may be designed with a complementary tongue and groove structure, to enable the individual bi-cell units to be easily stacked in series to achieve a desired power output, as illustrated in FIGS. 9 and 10. The tongue and groove structures may be set in flow holes for the electrolyte and hydrogen. Referring to FIG. 2B, the overmold of the bi-cell unit may provide sealing bumps 202 that align with complementary sealing sags 203 to secure adjoining bi-cells in proper alignment and provide a seal without the incorporation of special sealers. The sags and bumps may be set parallel or perpendicular to the planes of the electrodes. It is understood that the tongue and groove structure disclosed herein is but one of the means known in the art which fall within the scope of this invention for connecting the bi-cell units.

A mold cavity is produced with by two halves, which combine to represent the peripheral form of the bi-cell unit. The electrodes and distributors are stacked into one of the cavity halves. Retractable pins are set in the cavity half. The retractable pins are positioned to align with the mechanical restraints of the electrodes and distributors to ensure that the stacked bi-cell maintains a proper alignment during the injection molding process. Additionally, flow holes for hydrogen and electrolyte may serve an additional function as mechanical restraints as well. In a preferred embodiment, the retractable pins are provided by a backing plate behind the cavity half in which the electrodes and distributors are initially secured. The retractable pins are attached to the backing plate and the retractable pins are slid through corresponding pinholes in the cavity half. A first air/oxygen electrode is then positioned in the cavity side with the retractable pins inserted through the mechanical restraints of the first air/oxygen electrode. Next, a first electrolyte distributor is stacked onto the first air/oxygen electrode followed by a first hydrogen electrode, a gas diffuser/distributor, a second hydrogen electrode, a second electrolyte distributor and a second air/oxygen electrode with the retractable pins inserted through the respective mechanical restraints of the electrodes and distributors. The complimentary half of the mold cavity is then placed over the second air/oxygen electrode. The mold cavity is designed to ensure the elastomeric material does not flow into contact with the air/oxygen electrodes by creating a seal around the air/oxygen electrodes, because the air/oxygen electrodes must be able to contact air.

A loose insert may be set between the current collector grids, illustrated as 1406, 1408, 1410 and 1412 in FIG. 14, of the electrodes of the electrodes to prevent the flow of elastomeric material into that section of the mold. The loose insert is preferably offset to conform to the positions of the respective current collector grids 1406. If a loose insert is not utilized, the elastomeric material needs to be cut from current collector grids upon hardening, therefore, a loose insert is preferably incorporated. The loose insert is set into the mold after the first hydrogen electrode is set into the mold establishing a solid form to prevent the flow of elastomeric material between the current collector grids of the first oxygen electrode 1606 and the second hydrogen electrode 1412 and between the first hydrogen electrode 1410 and the second oxygen electrode 1408. The respective shapes of the halves of the mold prevent the flow of elastomeric material to the outside sections of the current collector grids 1406, 1408, 1410 and 1412.

At least one flow channel is provided, preferably between the halves, to allow the elastomeric material to flow into the mold. In another embodiment, the flow channel(s) is(are) bored through a cavity half. The elastomeric material is prepared for the molding process by heating to a point of consistent flow. Then, the elastomeric material is injected into the mold through the flow channel(s). The elastomeric material overmolds all the electrodes, distributors, flow holes and through holes, except for the area maintained for air to connect the air/oxygen electrode, illustrated as 1404 in FIG. 14, and the areas occupied by the retractable pins. After the elastomeric material has hardened the cavity halves are separated, the retractable pins are retracted and the overmolded bi-cell, referred to generally as 1400 in FIG. 14, is removed from the mold.

The preferred construction material of the mold cavity halves is steel. However, any solid material capable of withstanding the temperatures of the flowing elastomer (300° F. to 350° F.) and thermal control (described below) may be used, such as aluminum. The cavity halves are designed with thermal control to ensure that the necessary temperature (300° F. to 350° F.) is maintained in the cavity to allow the elastomeric material to flow throughout the desired portions of the cavity and to not harden prematurely. Preferably, thermal control pipes are set throughout the cavity halves to allow heat to be pumped through the pipes during the molding process. A liquid, such as sufficiently hot water, may be pumped through the pipes to maintain a sufficient temperature throughout the cavity during the molding process. Further, the pipes allow for cooling flow to be pumped through the pipe to promote the solidifying of the elastomeric material mold. However, the temperature of the mold cavity may be maintained using any heating method known in the art, such as an oven or electrical heat.

The preferred elastomeric material is SANTROPENE® Thermoplastic Rubber, which is sold by Advanced Elastomer Systems of Akron, Ohio. SANTROPENE® is an alloy of ethylene propylene diene monomer (EPDM) and polypropylene. SANTROPENE® will bond very well to polypropylene materials, therefore the preferred construction materials of various components of the bi-cells is polypropylene. However, other elastomeric materials may be incorporated, if the desired characteristics are present. The desired characteristics of the elastomeric material include resistance to the electrolyte, the ability to withstand the temperatures attained within the fuel cell (up to 80° C.) and the ability to absorb the thermal expansion of the electrodes as the temperature increases. Also, the elastomeric material preferably has the ability to bond to the respective construction materials of the distributors and the electrodes without bonding to the bi-cell die used during the injection of the elastomeric material. For example, EPDM may be used.

Figure 12:
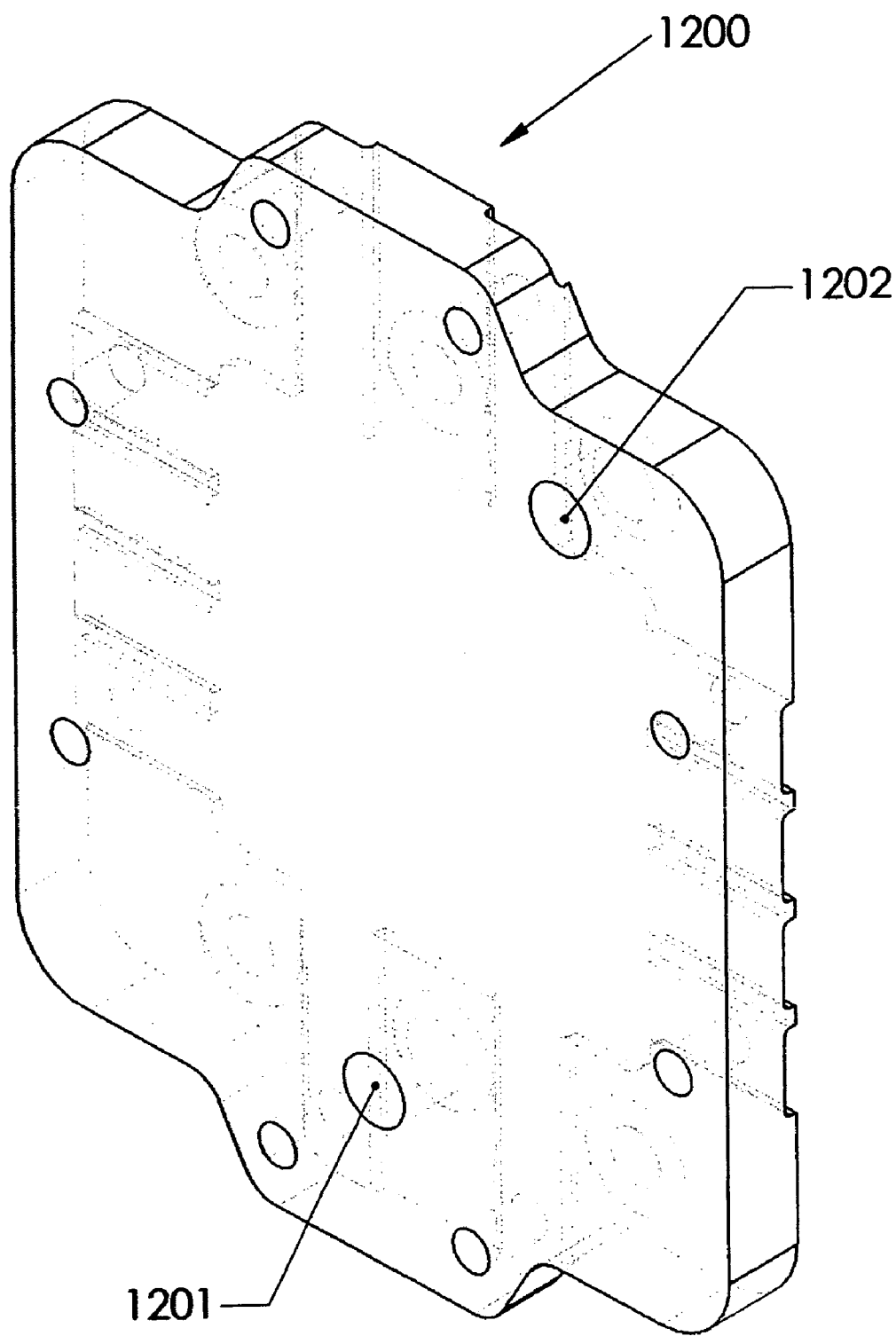
FIG. 12 is an illustration of front end plate that is designed to be bolted to a back endplate of an embodiment of the present invention.
Figure 13:
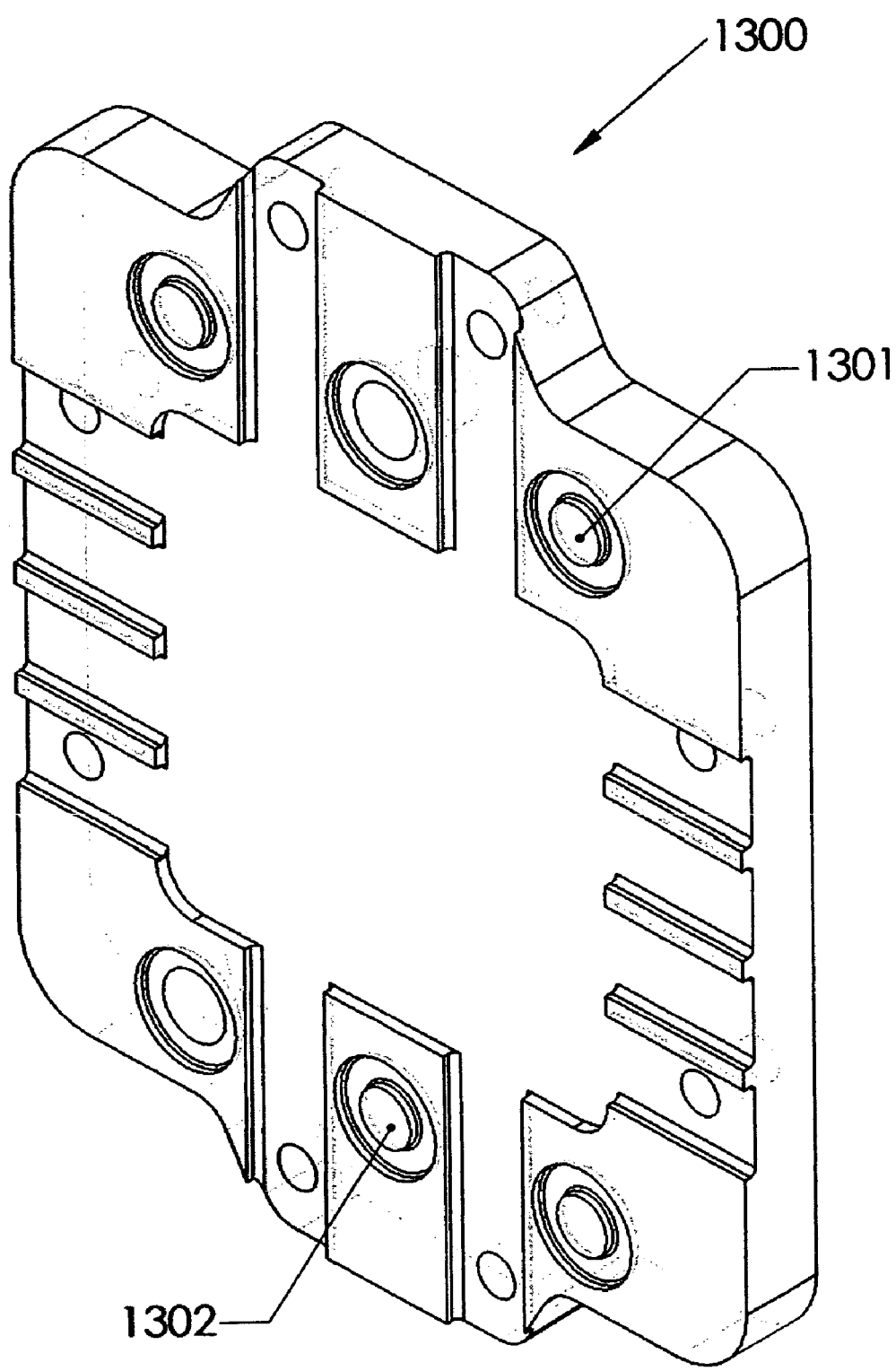
FIG. 13 is an illustration of a back end plate that is designed to be bolted to a front endplate of an embodiment of the present invention.

Endplate frames may be used to provide support to the fuel cell stack while providing the air electrodes at the end of the fuel cell stack with air. A depiction of a front endplate frame secured with bolts, referred to generally as 1200, is shown in FIG. 12. The front endplate may be designed with an electrolyte inlet 1201 and a hydrogen inlet 1202. A depiction of a back endplate frame secured with bolts, referred to generally as 1300, is shown in FIG. 13. The back endplate may be designed with an electrolyte outlet 1301 and a hydrogen outlet 1302. The endplate frames are pressed against the outer air electrodes such that air can freely contact the air contacting surface of the air electrode while support is provided to the fuel cell stack. Preferably, an air electrode spacer is set between the respective endplate and the outer air electrode. The endplate frames are then bolted together to hold the overmolded bi-cells in proper alignment. Complementary holes may be set through the entire fuel cell stack and endplates for the hydrogen and electrolyte, respectively. The endplate frames may be flat or have depressions on the face in contact with the air electrode. The depressions may be located on the top, bottom, and sides of the frame side in contact with the air contacting surface of the air electrode. When pressed against the air electrode, the depressions form openings, which aid in supplying air to the air contacting surface of the air electrode. Additionally, the endplates may be designed with a complementary tongue and groove structure, to enable the outermost bi-cell units to be secured to the endplates, creating a seal.

In another embodiment, belts may be used to secure endplates, as illustrated in FIG. 10. Two belts 920a and 920b are illustrated. Twelve bi-cell units are interconnected and steel belts 920a and 920b are wrapped around the twelve bi-cell units to secure the fuel cell 9000. The endplates 910 and 911 may have approximately the same dimensions as the bi-cell units, because no excess space is required to accommodate bolts. However, the bottom portion of the endplates 910 and 911 may have extended portions 915 to raise the bi-cells off a flat surface, thus allowing air to contact the air electrode through the bottom portion of the fuel cell 9000. Each steel belt has complementary holes for the hydrogen inlet 914 and outlet (not shown) and the electrolyte inlet 912 and outlet 913. Preferably, an air electrode spacer is set between the respective endplate and the outer air electrode. Also, the endplates 910 and 911 preferably have complementary holes aligned with the holes of the belts 920a and 920b. Additionally, the endplates 910 and 911 may be designed with a complementary tongue and groove structure, to enable the outermost bi-cell units to be secured to the endplates, creating a seal.

Figure 11:
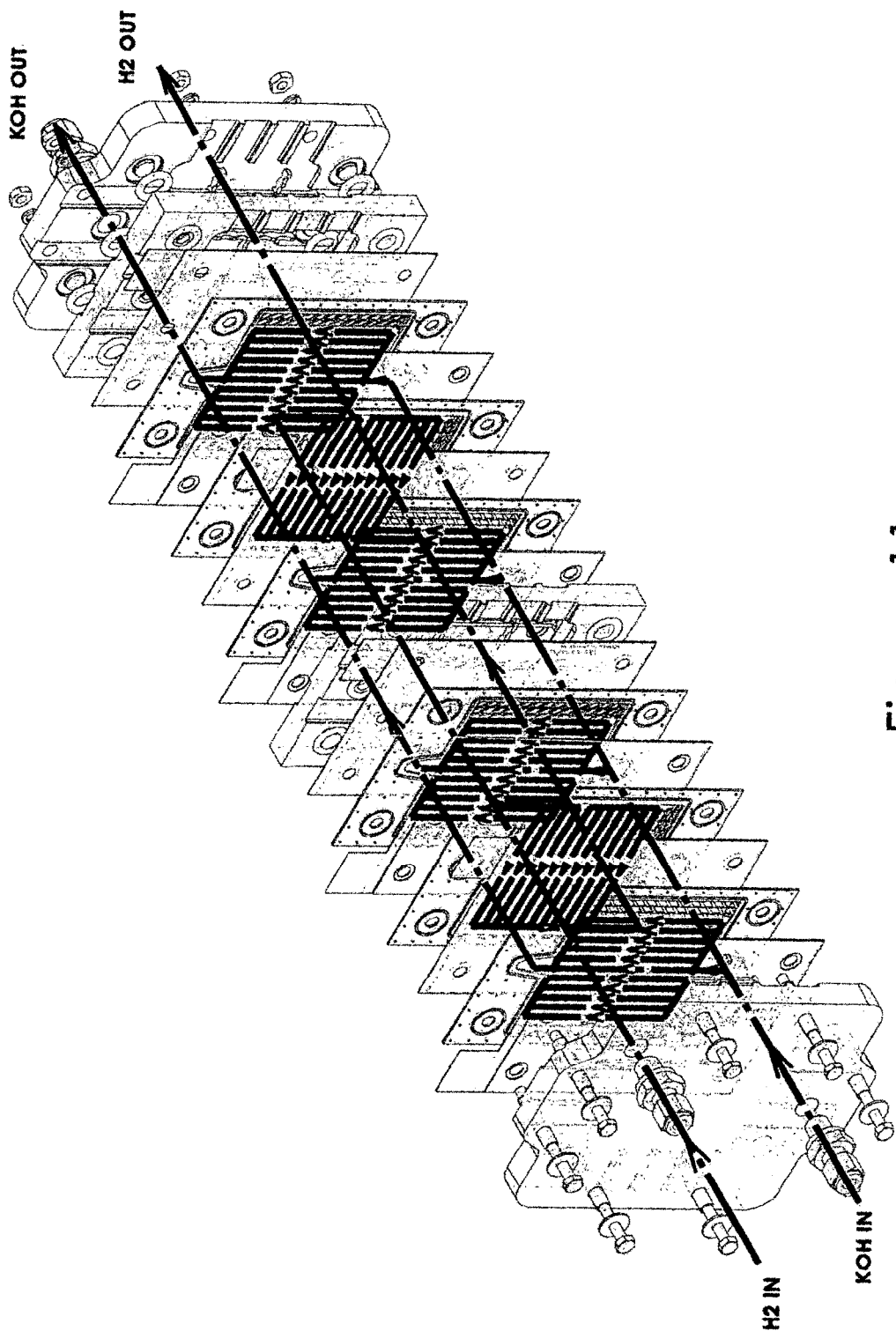
FIG. 11 an illustration of air, hydrogen, and electrolyte flow through a bi-cell fuel cell of an embodiment of the present invention.

The "air breathing" air electrodes of the present invention receive their supply of air from ambient air. A depiction of the non-forced flow of air through the fuel cell stack is shown in FIG. 11. Air is supplied from the atmosphere to the fuel cell pack through openings in the side and bottom of the fuel cell pack casing. Upon entering the casing, air enters into the air flow-through passageway through openings formed between the air electrodes, which are positioned on the outside ends of the bi-cell subassembly. Inside the air flow-through passageway, air contacts the air contacting surfaces of the air electrodes and supplies oxygen for the air electrode oxidation reactions. The oxygen concentration gradient between air outside the fuel cell stack and air within the fuel cell stack and/or thermal convection from heat produced within the fuel cell stack cause circulation of the air stream. As the warm oxygen depleted air rises and exits through the top of the fuel cell pack, cool air enters the air flow-through passageway and replaces the warmed oxygen depleted air to maintain operation of the fuel cell pack.

A depiction of the flow of hydrogen from the hydrogen inlet to the hydrogen chambers of the fuel cell stack is shown in FIG. 11. During operation of the fuel cell stack, hydrogen is continually supplied through the hydrogen inlet of the fuel cell pack from a hydrogen supply subsystem contained within or proximate to the fuel cell pack. Hydrogen enters the hydrogen inlet of the fuel cell pack and flows through a passage formed by openings in each layer of the fuel cell stack to reach the hydrogen chambers. The hydrogen enters the hydrogen chambers through one or more hydrogen flow channels formed by cutout sections in hydrogen electrode spacers located between the hydrogen electrodes or hydrogen electrode frames and is distributed across the hydrogen contacting surfaces of both of the hydrogen electrodes by the hydrogen electrode spacer. The flow of hydrogen from the hydrogen supply subsystem is designed to allow all of the hydrogen input into the fuel cell stack to be consumed by the hydrogen electrodes, thereby eliminating the need for a hydrogen outlet. This mode is generally known as a "dead end supply." However, a hydrogen outlet may be incorporated, as illustrated in FIG. 13. A hydrogen outlet may be included as a safety measure and for purging of hydrogen, if necessary. The hydrogen supply subsystem maintains a continual supply of hydrogen to the hydrogen electrodes by supplying hydrogen to the fuel cell stack at a pressure slightly higher than the pressure inside the hydrogen chambers, essentially replacing the hydrogen consumed within the hydrogen chambers. To maintain a continual supply of hydrogen to the hydrogen electrodes for various power outputs, the pressure of the hydrogen supply may need to be varied accordingly to accommodate increases and decreases in the amount of hydrogen consumed by the hydrogen electrodes.

A depiction of the non-forced convectional flow of electrolyte solution through the electrolyte loop of the fuel cell stack is shown in FIG. 11. The flow of electrolyte solution throughout the electrolyte loop occurs via convection without the need for pumping devices. The non-forced convectional electrolyte circulation enables excellent electrochemical activity and a long electrode lifetime in addition to lowering the parasitic power losses. The electrolyte loop maintains a continual supply of electrolyte within the fuel cell stack at all times. During operation of the fuel cell stack, non-forced convectional flow of electrolyte throughout the electrolyte loop results from the electrolyte being heated in the electrolyte chamber by the exothermic reactions occurring at the electrolyte contacting surfaces of the electrodes. As the electrolyte solution is heated, the electrolyte solution begins to rise via convection and exits the electrolyte chamber. Upon exiting the electrolyte chamber, the heated electrolyte solution continues to flow through a passage formed by openings in each layer of the fuel cell stack and exits through the electrolyte outlet. The heated electrolyte solution continues to rise until it reaches an electrolyte reservoir, positioned at a height higher than the fuel cell stack, where it is cooled to ambient temperatures. As the heated electrolyte solution rises through the electrolyte loop, cooled electrolyte from the electrolyte reservoir flows down through the electrolyte loop via gravity. The cooled electrolyte enters the fuel cell stack through the electrolyte inlet, flows through a passage formed by openings in each layer for the fuel cell stack to reach the electrolyte chambers, and replaces the heated electrolyte exiting the electrolyte chamber. The electrolyte reservoir also allows for removal of gas bubbles and water produced by the operating cell. Gas bubbles and water vapor produced at the hydrogen electrode during operation of the fuel cell in the electrolyte solution rise with the warms electrolyte and exit the system through an opening in the electrolyte reservoir.

An embodiment of the present invention may incorporate a hydrogen supply subsystem as described in application Ser. No. 10/364,978 filed on Feb. 12, 2003, which is hereby incorporated herein by reference. The hydrogen supply subsystem is adapted to connect to at least one hydrogen storage container and supply hydrogen from the hydrogen storage containers to the fuel cell stack at various pressures. The hydrogen storage containers may be contained inside or outside of the hydrogen supply subsystem depending on design requirements. The hydrogen storage containers may store hydrogen in gaseous, liquid, chemical hydride, or metal hydride form. The disposable hydrogen storage containers are connected to the hydrogen supply subsystem, which supplies hydrogen to the hydrogen inlet of the fuel cell pack. The hydrogen storage containers may be connected to the hydrogen supply subsystem using fast coupling connectors and tubes suitable for hydrogen transfer. When the hydrogen supply inside the hydrogen storage containers is expended, the empty containers are removed from the hydrogen supply subsystem and replaced with full containers.

Hydrogen storage containers may utilize a chemical hydride, which irreversibly stores hydrogen in hydride form. When brought into contact with water, the chemical hydride reacts and produces gaseous hydrogen. Examples of chemical hydrides are alkali metal hydrides, such as lithium borohydride ($LiBH_4$), sodium borohydride ($NaBH_4$), lithium aluminum hydride ($LiAlH_4$), and sodium aluminum hydride ($NaAlH_4$). Hydrogen storage containers utilizing chemical hydrides may incorporate a water delivery system to introduce a calculated amount of water to the chemical hydride to provide a desired quantity of hydrogen from the chemical hydride at a specific pressure.

The hydrogen supply subsystem may utilize a heat management system to aid in removal of hydrogen from the hydrogen storage containers utilizing a hydrogen storage alloy. When hydrogen is stored in metal hydride form, heat is required to desorb hydrogen from the metal hydride. In cold temperatures, the desorption of hydrogen from metal hydrides is kinetically unfavorable, which may pose a problem when trying to provide a continual source of hydrogen from the metal hydride. A considerable amount of heat is produced within the fuel cell stack and is removed by air and electrolyte utilized within the fuel cell stack via convection. To utilize the heat being removed from the system, the hydrogen storage containers may be placed in thermal contact with the heated air and electrolyte exiting the fuel cell stack. Preferably, the hydrogen storage containers utilized in the hydrogen supply subsystem are positioned above the fuel cell stack such that hydrogen storage containers are in thermal contact with the heated air exiting through the top of the fuel cell stack via convection. A damper may be utilized to regulate the desorption rate of the hydrogen storage material by controlling the quantity of warm air flowing from the fuel cell to hydrogen storage container installed on top of the fuel cell. The damper may be set in an opening between the fuel cell and hydrogen storage container. The damper manipulates the size of the opening and the amount of air flowing there through. Specific structures, such as heat fins, may also be used within the hydrogen supply subsystem to transfer as much heat as possible from the heated oxygen depleted air exiting the fuel cell stack to the hydrogen storage containers. The hydrogen supply subsystem may also include a heat exchanger used to heat the hydrogen storage containers with the heated electrolyte exiting the fuel cell stack.

Water is produced as a product of the oxidation and reduction reactions taking place at the electrodes. A build-up of water in the electrolyte solution will cause a decrease in performance of the fuel cell. Excess water that is not removed as water vapor through the electrolyte reservoir may be removed from the electrolyte solution through various conventional methods, such as wicking, evaporation, etc. Water vapor, however, may also exit the fuel cell stack with the exiting air. During operation of the fuel cell pack, heat resulting from the oxidation and reduction reactions taking place at the electrodes causes water formed as a result of such reactions to be in the vapor form. This water vapor may diffuse through the air electrode and exit the fuel cell pack with the warmed air.

Figure 4:
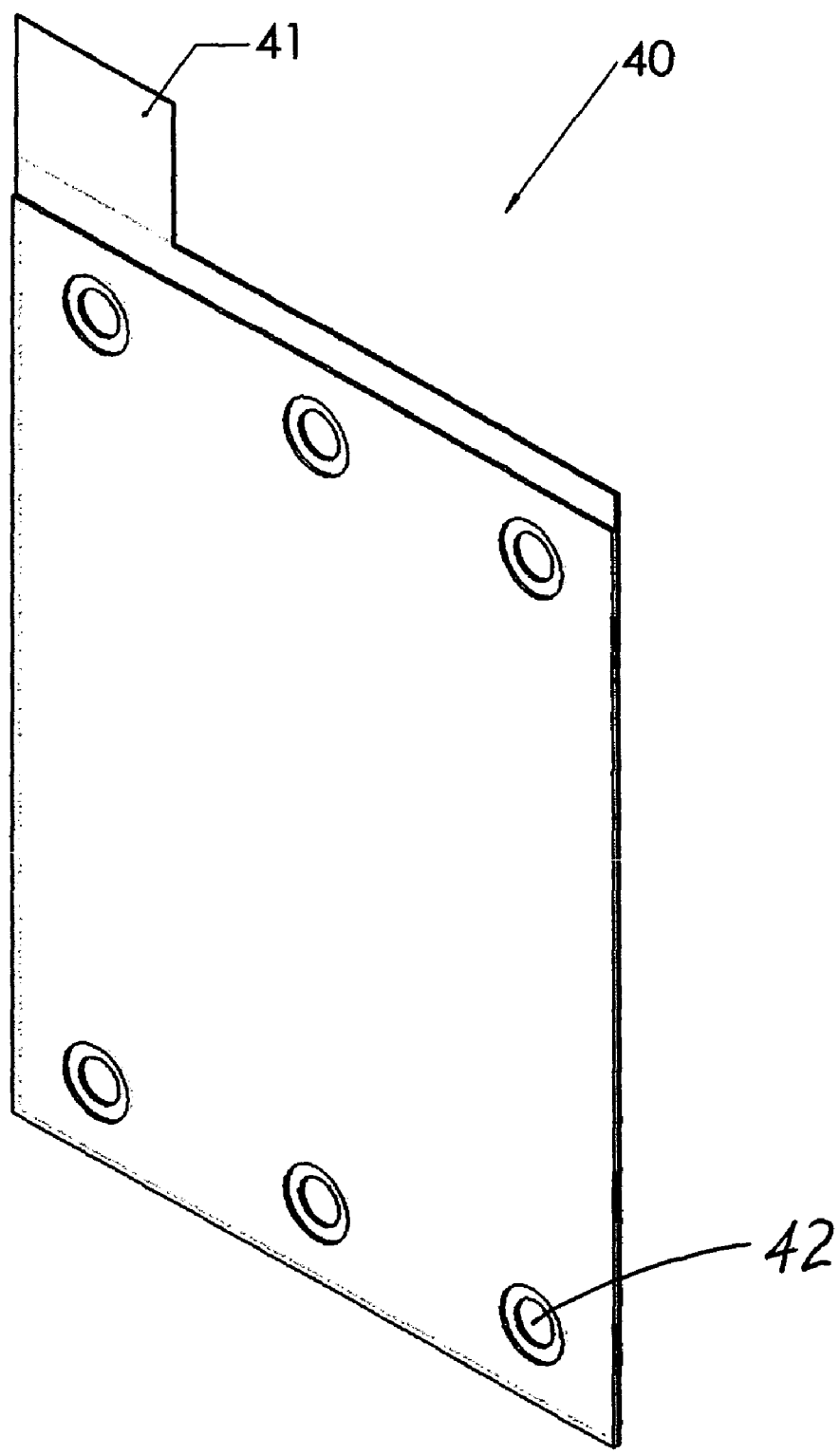
FIG. 4 is an illustration of a hydrogen electrode of an embodiment of the present invention.

A hydrogen electrode, referred to generally as 40, in accordance with the present invention is shown in FIG. 4. The hydrogen electrode may be comprised of an active hydrogen electrode material supported by at least one current collector grid 41. The holes hydrogen electrode preferably includes mechanical restraints 42 for the insertion of retractable pins in the mold cavity during the elastomeric material injection, as described in more detail above. The mechanical restraints hold the electrodes and distributors in proper alignment during the injection of the elastomeric material. FIG. 4 illustrates a hydrogen electrode having six mechanical restraints 42. The active hydrogen electrode material may be composed of Raney nickel, a hydrophobic binder material, and a conductive material, and optionally a Misch metal hydrogen storage alloy. A preferred composition of the active hydrogen electrode material in accordance with the present invention may be by weight 80 to 92% Raney catalytic material, 0.0 to 8.0% Misch Metal hydrogen storage alloy, 8.0% teflon, and 4.0% graphite.

The current collector grids in accordance with the present invention may be selected from, but not limited to, an electrically conductive mesh, grid, foam, expanded metal, or combination thereof. A preferred current collector grid is an electrically conductive mesh having approximately 40 wires per inch horizontally and approximately 20 wires per inch vertically, although other meshes may work equally well. The wires comprising the mesh may have a diameter between 0.005 inches and 0.01 inches, preferably between 0.005 inches and 0.008 inches. This design provides enhanced current distribution due to the reduction of the ohmic resistance. However, where more than 20 wires per inch are vertically positioned, problems may be encountered when affixing the active material to the substrate. One current collector grid may be used in accordance with the present invention, however the use of two or more current collector grids may be used to further increase the mechanical integrity of the electrode.

To produce the hydrogen electrode, the components are mixed together and rolled into ribbons of active hydrogen electrode material. The ribbon of active hydrogen storage material/catalyst is placed between two current collector grids and re-rolled to form the hydrogen electrode. Typically, the hydrogen electrode is sintered in nitrogen at 320° C. for half an hour then cooled to room temperature in a nitrogen environment. Other sintering environments and temperatures may be utilized.

Figure 5:
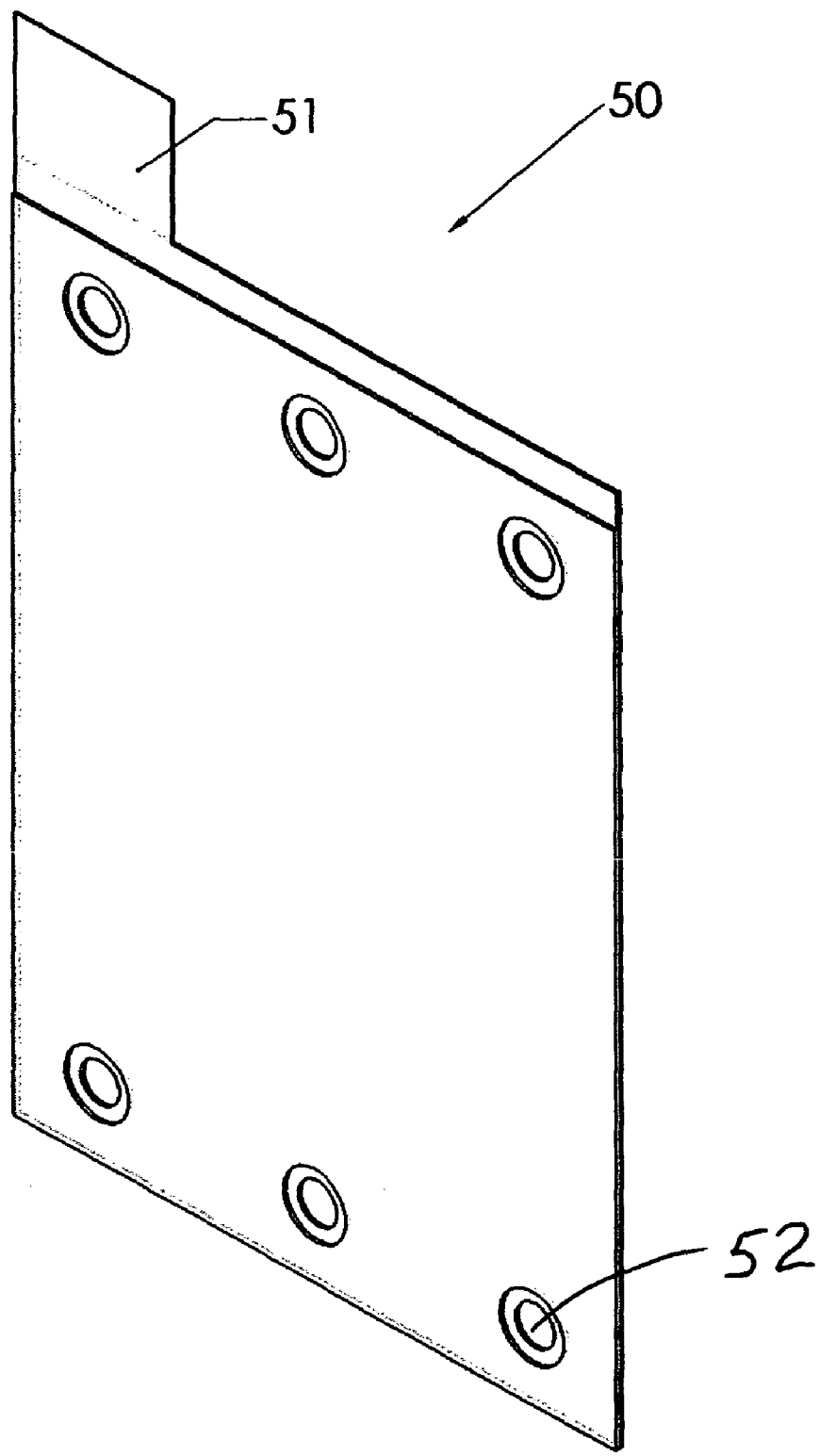
FIG. 5 is an illustration of an air/oxygen electrode of an embodiment of the present invention.

An air electrode, referred to generally as 50, in accordance with the present invention is shown in FIG. 5. The air electrode may be composed of an active material layer having a built-in hydrophobic character, a gas diffusion layer having a greater built-in hydrophobic character than the active material layer, and at least one current collector grid 51. The air electrode preferably includes mechanical restraints 52 for the insertion of retractable pins in the mold cavity during the elastomeric material injection, as described in more detail above. The mechanical restraints hold the electrodes and distributors in proper alignment during the injection of the elastomeric material. FIG. 5 illustrates an air electrode having six mechanical restraints 52. The active material layer and the gas diffusion layer are positioned adjacent to each other and supported by at least one current collector grid. The current collector grid may be the same as used for the hydrogen electrode.

The gas diffusion layer of the air electrode in accordance with the present invention is composed of a teflonated carbon matrix. The teflonated carbon matrix may be comprised of 40-45% teflonated acetylene black carbon or 50-60% teflonated Vulcan XC-72 carbon (Trademark of Cabot Corp.).

The active material layer of the air electrode in accordance with the present invention is prepared by first preparing a carbon matrix. The carbon matrix is composed of carbon particles coated with PTFE. The carbon particles are preferably carbon black particles, such as Black Pearl 2000 (Trademark of Cabot Corp.). The carbon/PTFE black mixture contains approximately 10 to 30% PTFE with the remainder being carbon black particles.

To prepare the air electrode, the gas diffusion layer is first deposited onto a current collector grid. Approximately 6-10 g of gas diffusion layer material is deposited onto the current collector grid per 100 $cm^2$. The active material layer is then deposited onto the gas diffusion layer. Approximately 2-3 grams of active material layer material is deposited onto the gas diffusion layer per 100 $cm^2$. After depositing the gas diffusion layer, a second current collector grid is placed on top of the active material layer to complete the air electrode. The air electrode is hot pressed at a pressure of 0.3 tons per $cm^2$. The electrode is subsequently cooled to room temperature.

The active material layer of the air electrode is then impregnated with an active catalyst material. The air electrode is dipped into an aqueous solution of an active catalyst material precursor. The active catalyst material precursor may be applied from a 1M $AgNO_3$ solution and 10% by weight sugar as a reducing agent. Once submerged in the aqueous active catalyst material precursor solution, the solution may be pulled into the active material layer under vacuum. The varying layers of hydrophobicity between the gas diffusion layer and the active material layer allow the solution to penetrate into the pores within the active material layer and not penetrate into the gas diffusion layer. The active catalyst material is deposited from the aqueous solution in the pores within the active material layer and any air or gases present in the solution pass through the gas diffusion layer. In addition to dipping in the aqueous solution, the impregnation may be performed by spraying, spreading or screen printing the active catalyst on the electrode surface. After removing the air electrode from the active catalyst material solution, the air electrode is dried at room temperature. The air electrode is then heat treated at 50 degrees Celsius to remove any water from the electrode. Remaining in the pores of the active material layer is excess nitrate from the active catalyst precursor. The air electrode may then be heat treated at 300-375 degrees Celsius for half an hour to decompose any remaining nitrates into oxides. Depending upon the catalyst used, these oxides may further decompose to produce their parent metal catalysts. To add more catalyst the above process is repeated as necessary. The air electrode is then cooled and ready for use. After impregnation, the active catalyst material forms submicron to nano particles of the active catalyst material within the carbon matrix.

The foregoing is provided for purposes of explaining and disclosing preferred embodiments of the present invention. It will be apparent to those skilled in the art that variations and modifications of the present invention can be made without departing from the scope or spirit of the invention. For example, changes to the shape of the fuel cell, the type of hydrogen storage alloy, construction material of the various components, the cathode active material, the shape and design of the electrodes within the fuel cell, the shape and design of the pins, the method of interconnecting bi-cells in series, the manner of retracting the retractable pins, the manner of heating the cavity halves and the shape and design of the electrode flow channels, will be apparent to those skilled in the art. These changes and others may be made without departing from the scope or spirit of the invention in the following claims.

We claim:

1. A fuel cell comprising: at least one bi-cell, said bi-cell comprising: a first hydrogen electrode having a hydrogen contacting surface and an electrolyte contacting surface; a second hydrogen electrode having a hydrogen contacting surface and an electrolyte contacting surface, said hydrogen contacting surface of said first hydrogen electrode disposed adjacent to said hydrogen contacting surface of said second hydrogen electrode; a first air electrode having an air contacting surface and an electrolyte contacting surface, said electrolyte contacting surface of said first air electrode disposed adjacent to said electrolyte contacting surface of said first hydrogen electrode; a second air electrode having an air contacting surface and an electrolyte contacting surface, said electrolyte contacting surface of said second air electrode disposed adjacent to said electrolyte contacting surface of said second hydrogen electrode; and elastomeric material bonded around said bi-cell, said elastomeric material providing mechanical support for said bi-cell and having open portions providing access for air to contact each of said air electrodes.

2. The fuel cell of claim 1, said bi-cell further comprising: a first electrolyte distributor disposed between said electrolyte contacting surface of said first air electrode and said electrolyte contacting surface of said first hydrogen electrode; a second electrolyte distributor disposed between said electrolyte contacting surface of said second air electrode and said electrolyte contacting surface of said second hydrogen electrode; and a gas diffuser disposed between said hydrogen contacting surface of said first hydrogen electrode and said hydrogen contacting surface of said second hydrogen electrode.

3. The fuel cell of claim 2, said first electrolyte distributor having a first side and a second side, each of said sides of said first electrolyte distributor having an electrolyte rib, said electrolyte rib of said first side of said first electrolyte distributor providing sealing for a first air electrode electrolyte inlet, said first air electrode electrolyte contacting surface and a first air electrode electrolyte outlet; said electrolyte rib of said second side of said first electrolyte distributor providing sealing for a first hydrogen electrode electrolyte inlet, said first hydrogen electrode electrolyte contacting surface and a first hydrogen electrode electrolyte outlet; said second electrolyte distributor having a first side and a second side, each of said sides of said second electrolyte distributor having an electrolyte rib, said electrolyte rib of said first side of said second electrolyte distributor providing sealing for a second air electrode electrolyte inlet, said second air electrode electrolyte contacting surface and a second air electrode electrolyte outlet; and said electrolyte rib of said second side of said second electrolyte distributor providing sealing for a second hydrogen electrode electrolyte inlet, said second hydrogen electrode electrolyte contacting surface and a second hydrogen electrode electrolyte outlet.

4. The fuel cell of claim 3, said gas diffuser having a first side and a second side, each of said first and second gas diffuser sides having a hydrogen rib, said hydrogen rib of said first side of said gas diffuser providing sealing for a first hydrogen electrode hydrogen inlet, said first hydrogen electrode hydrogen contacting surface and a first hydrogen electrode hydrogen outlet; and said hydrogen rib of said second side of said gas diffuser providing sealing for a second hydrogen electrode hydrogen inlet, said second hydrogen electrode hydrogen contacting surface and a second hydrogen electrode hydrogen outlet.

5. The fuel cell of claim 2, each of said electrolyte distributors having a plurality of pins disposed between each of said electrolyte distributors and each of said electrodes, said pins providing structural support and uniform spacing between each of said electrodes and each of said electrolyte distributors.

6. The fuel cell of claim 5, said gas diffuser having a plurality of pins disposed between said gas diffuser and each of said hydrogen electrodes, said pins providing structural support and uniform spacing between each of said hydrogen electrodes and said gas diffuser.

7. The fuel cell of claim 4, said bi-cell further comprising an elastomeric material bonded between each of said electrolyte distributors and each of said electrodes and between said gas diffuser and each of said hydrogen electrodes, said elastomeric material providing mechanical support and each of said ribs providing sealing for said elastomeric material.

8. The fuel cell of claim 6, said bi-cell further comprising an elastomeric material bonded between each of said electrolyte distributors and each of said electrodes and between said gas diffuser and each of said hydrogen electrodes, said elastomeric material providing mechanical support and each of said ribs providing sealing for said elastomeric material.

9. The fuel cell of claims 7 or 8, said elastomeric material comprising a compound of EPOM and polypropylene.

10. The fuel cell of claim 2, said fuel cell further comprising a first end plate and a second endplate, each of said at least one bi-cell disposed in series between said first endplate and said second endplate.

11. The fuel cell of claim 2, said fuel cell further comprising at least one steel belt, said at least one steel belt securing a plurality of bi-cells in series between said first endplate and said second endplate.

12. The fuel cell of claim 9, said fuel cell comprising a plurality of bi-cells stacked in series and wherein adjacent bi-cells are connected by means of mating tongue and groove combinations, said tongue and groove combinations interconnecting hydrogen gas flow holes, electrolyte flow holes and through holes of said bi-cells.

13. The fuel cell of claim 4, each of said electrolyte distributors having at least one mechanical restraint, each mechanical restraint having a mechanical restraint rib on each side of each of said electrolyte distributor.

14. The fuel cell of claim 1, wherein each of said air contacting surfaces of said air electrodes are adjacent an air flow-through passageway.

15. The fuel cell of claim 1, each of said air electrodes, each of said hydrogen electrodes, each of said electrolyte distributors and said gas diffuser having at least one mechanical restraint hole.

16. The fuel cell of claim 10, said first end plate having a hydrogen inlet and an electrolyte inlet and said second end plate having a hydrogen outlet and an electrolyte outlet.

17. The fuel cell of claim 1, further comprising: a hydrogen supply subsystem; and a protective casing.

18. The fuel cell of claim 17, wherein said hydrogen supply subsystem is in gaseous communication with said fuel cell stack, said hydrogen supply subsystem being adapted to receive a supply of hydrogen from at least one hydrogen storage container and distribute said supply of hydrogen to said fuel cell stack.

19. The fuel cell of claim 17, wherein said hydrogen storage containers are adapted to store hydrogen in a liquid form, gaseous form, a chemical hydride form, and a metal hydride form.

20. The fuel cell of claim 17, wherein said hydrogen storage containers are adapted to store hydrogen in a metal hydride form.

* * * * *